(12) United States Patent  (10) Patent No.: US 8,547,924 B2
Ode et al.  (45) Date of Patent: *Oct. 1, 2013

(54) COMMUNICATIONS APPARATUS AND COMMUNICATIONS SYSTEM USING MULTICARRIER TRANSMISSION MODE

(75) Inventors: Takayoshi Ode, Kawasaki (JP);
Yoshihiro Kawasaki, Kawasaki (JP);
Kazuo Kawabata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/555,780

(22) Filed: Jul. 23, 2012

(65) Prior Publication Data

US 2012/0287891 A1  Nov. 15, 2012

Related U.S. Application Data

(63) Continuation of application No. 12/607,570, filed on Oct. 28, 2009, now Pat. No. 8,363,610, which is a continuation of application No. 11/790,789, filed on Apr. 27, 2007, now Pat. No. 7,953,167, which is a continuation of application No. PCT/JP2004/016154, filed on Oct. 29, 2004.

(51) Int. Cl.
*H04W 4/00* (2009.01)
*H04J 11/00* (2006.01)
*H04B 7/00* (2006.01)
*H04Q 7/20* (2006.01)

(52) U.S. Cl.
USPC ........... 370/329; 370/331; 370/208; 375/260; 455/67.11; 455/450

(58) Field of Classification Search
USPC . 370/200–410; 455/67.1–466; 375/141–285
See application file for complete search history.

(56) References Cited

U.S. PATENT DOCUMENTS 6,128,490 A * 10/2000 Shaheen et al. ............... 455/434
6,351,461 B1    2/2002 Sakoda et al.
(Continued)

FOREIGN PATENT DOCUMENTS

CN      1269950     10/2000
EP      1 343 338    9/2003
(Continued)

OTHER PUBLICATIONS

Japanese Patent Office Office Action"Notice of Reasons for Rejection" for corresponding Japanese Patent Application No. 2006-542184, with a mailing date of Aug. 11, 2009; English translation attached.

(Continued)

*Primary Examiner* — Afsar M. Qureshi
(74) *Attorney, Agent, or Firm* — Myers Wolin, LLC

(57) ABSTRACT

A communications system for exchange of information between communications apparatuses by a multicarrier transmission mode using a plurality of subcarriers, includes a transmission data generator configured to generate frequency band information indicating which frequency band is to be used for transmission of data information between said communication apparatuses; a transmitter configured to transmit the frequency band information by using a specific frequency band which is set from among a plurality of frequency band assigned to the communications system, and to transmit data information by using at least one frequency band set from among said plurality of frequency bands; a receiver configured to receive the frequency band information by using the specific frequency band, whereby the specific frequency band among said plurality of frequency bands and at least one frequency band set among the plurality of frequency bands, other than the specific frequency band, are made variable to avoid overlap.

5 Claims, 35 Drawing Sheets

(56) References Cited

U.S. PATENT DOCUMENTS

| | | |
|---|---|---|
| 6,400,679 B1 | 6/2002 | Suzuki |
| 6,567,383 B1 | 5/2003 | Bohnke |
| 6,885,697 B1 | 4/2005 | Tokunaga et al. |
| 7,126,996 B2 * | 10/2006 | Classon et al. ............... 375/260 |
| 7,128,490 B2 | 10/2006 | McEwan |
| 7,245,879 B2 | 7/2007 | Sadri et al. |
| 7,286,613 B2 | 10/2007 | Baron et al. |
| 7,292,824 B2 | 11/2007 | Yamaguchi et al. |
| 7,342,973 B2 | 3/2008 | Walker et al. |
| 7,352,767 B2 | 4/2008 | Jang |
| 7,760,820 B2 | 7/2010 | Lei et al. |
| 7,953,167 B2 | 5/2011 | Ode et al. |
| 2001/0024427 A1 | 9/2001 | Suzuki |
| 2004/0001429 A1 | 1/2004 | Ma et al. |
| 2004/0047431 A1 | 3/2004 | Baron et al. |
| 2004/0088388 A1 | 5/2004 | Satoh et al. |

FOREIGN PATENT DOCUMENTS

| | | |
|---|---|---|
| JP | 9-205411 | 8/1997 |
| JP | 10-191431 | 7/1998 |
| JP | 10-224659 | 8/1998 |
| JP | 2000-032565 | 1/2000 |
| JP | 2001-036499 | 2/2001 |
| JP | 2001-238269 | 8/2001 |
| JP | 2001-298436 | 10/2001 |
| JP | 2002-111631 | 4/2002 |
| JP | 2002-319917 | 10/2002 |
| JP | 2002-330467 | 11/2002 |
| JP | 2003-101499 | 4/2003 |
| JP | 2003-264524 | 9/2003 |
| JP | 2003-264867 | 9/2003 |
| JP | 2004-186853 | 7/2004 |
| JP | 2004-214746 | 7/2004 |
| JP | 2004-242059 | 8/2004 |
| JP | 2004-537875 | 12/2004 |
| WO | 98/51103 | 11/1998 |
| WO | 00/74415 | 12/2000 |
| WO | 02/49306 | 6/2002 |

OTHER PUBLICATIONS

Japanese Patent Office, Office Action, "Notice of Reasons for Rejection" for corresponding Japanese Patent Application No. 2006-542184, with a mailing date of Jan. 5, 2010. English translation attached.

"Non-Final Office Action" issued by the United States Patent & Trademark Office for corresponding U.S. Appl. No. 12/607,570, on Nov. 10, 2011.

"Non-Final Office Action" issued by the United States Patent & Trademark Office for corresponding U.S. Appl. No. 11/790,789 on Jun. 24, 2008.

"Non-Final Office Action" issued by the United States Patent & Trademark Office for corresponding U.S. Appl. No. 11/790,789 on Feb. 23, 2009.

"Non-Final Office Action" issued by the United States Patent & Trademark Office for corresponding U.S. Appl. No. 11/790,789 on Nov. 13, 2009.

"Non-Final Office Action" issued by the United States Patent & Trademark Office for corresponding U.S. Appl. No. 11/790,789 on Jun. 11, 2010.

"Non-Final Office Action" issued by the United States Patent & Trademark Office for corresponding U.S. Appl. No. 11/790,789 on Nov. 23, 2010.

Office Action issued by the United States Patent and Trademark Office for corresponding U.S. Appl. No. 13/555,743, mailed on Oct. 24, 2012.

Official Office Action issued by the United States Patent and Trademark Office corresponding to U.S. Appl. No. 13/555,758, mailed Oct. 25, 2012.

Official Office Action issued by the United States Patent and Trademark Office for corresponding U.S. Appl. No. 13/093,383, electronically delivered Nov. 7, 2012.

Supplementary European Search Report, "Brief Communication" issued for corresponding European Patent Application No. 04793255.3, dated Jul. 6, 2012.

K. Takamura et al.; "Field Trial Results of a Band Hopping OFDM System"; IEEE 1999 vol. 1, Sep. 19, 1999 pp. 310-314; XP010352957; Vehicular Technology Conference 1999.

Third (3rd) Notification of Office Action issued for corresponding Chinese Patent Application No. 201010113078.6 dated Jul. 30, 2012 with English translation.

Notice of Reasons for Rejection issued for corresponding Japanese Application No. 2012-121278, mailed Oct. 2, 2012, with English translation.

Non-Final Office Action issued by the United States Patent and Trademark Office for corresponding U.S. Appl. No. 13/555,767, electronically delivered Jul. 25, 2013.

Non-Final Office Action issued by the United States Patent and Trademark Office for corresponding U.S. Appl. No. 13/566,552, electronically delivered Jul. 30, 2013.

Non-Final Office Action issued by the United States Patent and Trademark Office for corresponding U.S. Appl. No. 13/566,547, electronically delivered Jul. 31, 2013.

"'Electric Wave' Hint for establishing a wireless LAN which is robust against an electric wave and obstacles", N + 1 Network Guide, Nov. 1, 2003, pp. 52-58, vol. 3, Version 10, Softbank Publishing Limited, with partial English translation of column, lines 8-15, on p. 54.

Notice of Reasons for Rejection issued for corresponding Japanese Patent Application No. 2012-121293, mailed Jul. 9, 2013, with full English translation.

* cited by examiner

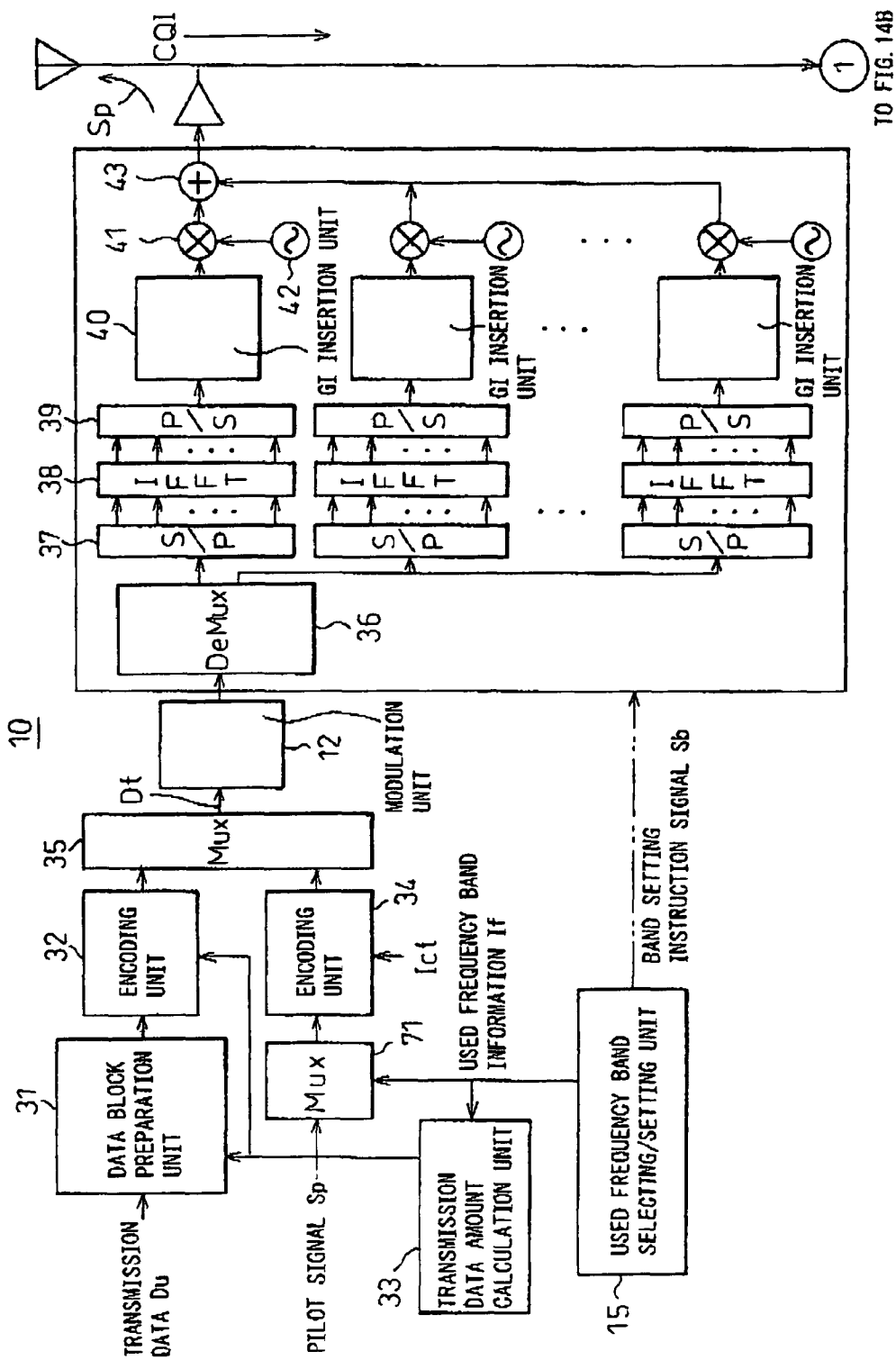

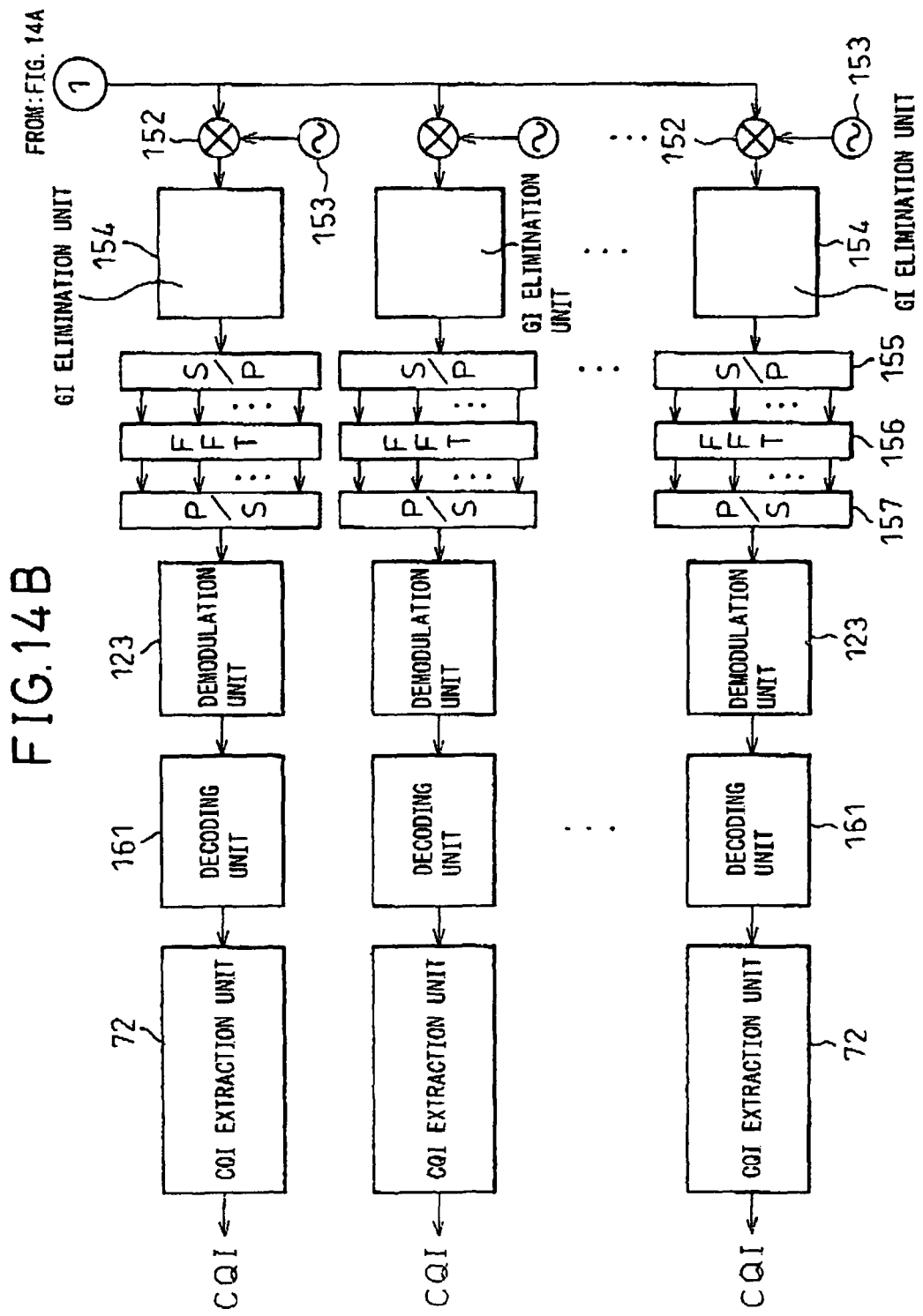

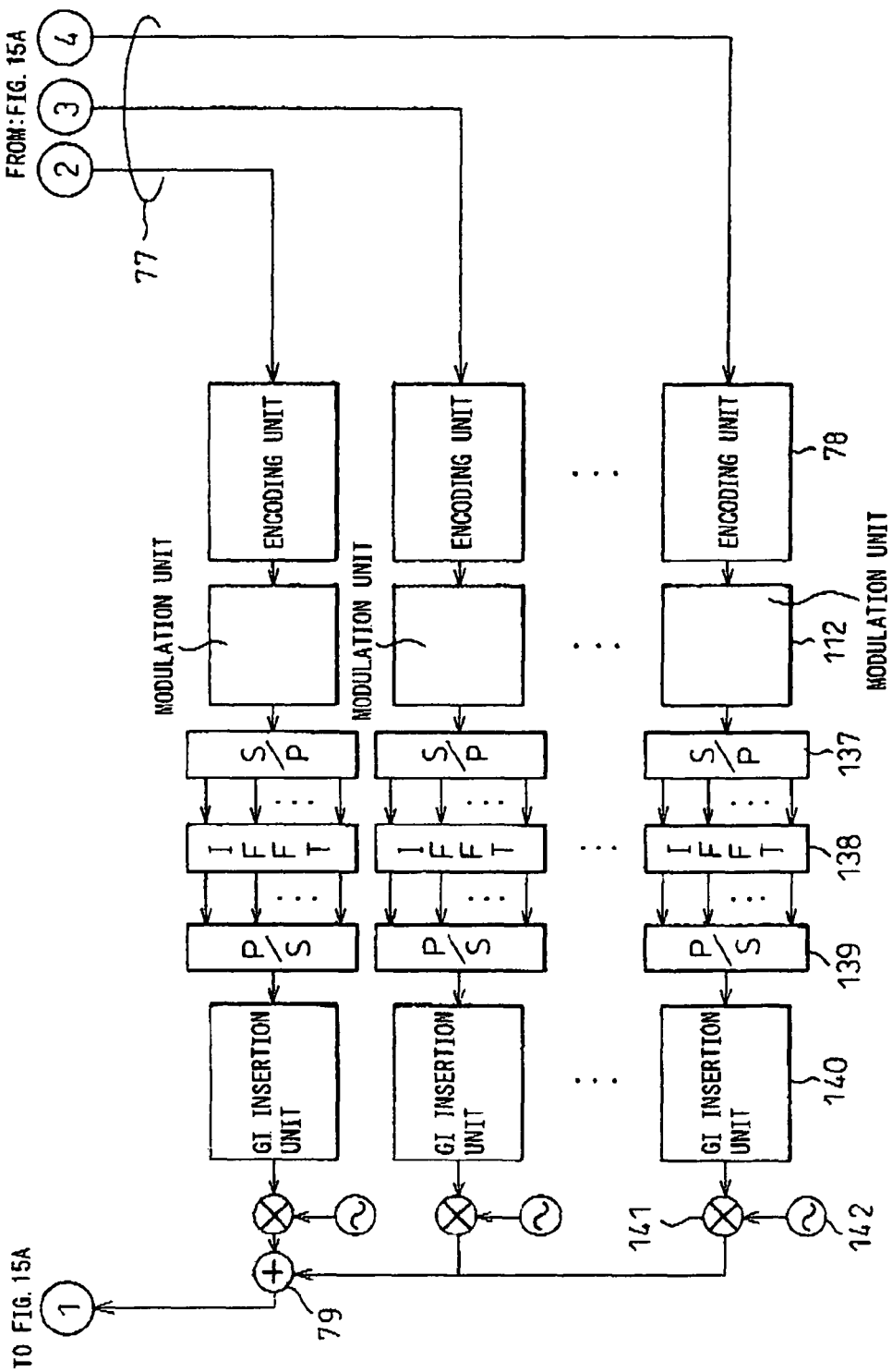

TIME

TIME

FIG. 26

TABLE_1

| FREQUENCY[MHz] | BAND NUMBER |
|---|---|
| 800~805 | 1 |
| 805~810 | 2 |
| 810~815 | 3 |
| 815~820 | 4 |

TABLE_2

| STATE | SET VALUE |
|---|---|
| USED AS MAIN BAND | 00 |
| NOT USE | 01,10 |
| USED AS EXTENSION BAND | 11 |

TABLE_3

| STATE | SET VALUE |
|---|---|
| USED AS MAIN BAND | 00 |
| NO CHANGE | 01 |
| NOT YET USED | 10 |
| USED AS EXTENSION BAND | 11 |

"RELATED ART"

"RELATED ART"

"RELATED ART"

COMMUNICATIONS APPARATUS AND COMMUNICATIONS SYSTEM USING MULTICARRIER TRANSMISSION MODE

CROSS REFERENCE TO RELATED APPLICATION

The present application is a continuation of U.S. application Ser. No. 12/607,570, filed on Oct. 28, 2009, now pending, which is a continuation of U.S. application Ser. No. 11/790,789, filed on Apr. 27, 2007, now U.S. Pat. No. 7,953,167, which is a continuation of International application No. PCT/JP2004/016154, filed on Oct. 29, 2004, the contents of each are herein wholly incorporated by reference.

TECHNICAL FIELD

The present invention relates to a communications system for exchange of information (data) between communications apparatuses by a multicarrier transmission mode by a series of subcarriers, more particularly relates to a communications apparatus accommodated in that communications system.

BACKGROUND ART

A most preferred example of the above communications system discussed in the present invention is a mobile communications system. The following explanation will be made by taking as an example this mobile communications system. Accordingly, if according to this example, the communications apparatus is a (i) base station (or a higher base station controller thereof) and/or a (ii) mobile station (including a mobile terminal such as a PDA). Note that for convenience, in the later explanation, the former (i) will be referred to as the "base station" and the latter (ii) will be simply referred to as the "terminal" in some cases. Note that, as will be clear in the later explanation, the present invention can be substantially equivalently applied to not only the above base station, but also the above terminal. It is not particularly necessary to differentiate between the two.

In a mobile communications system, securing a desired transmission rate for a user is a major issue in providing it with service. On the other hand, usually the used frequency band used by the mobile communications system is fixed for each system. Therefore, even if employing user multiplexing etc., the maximum transmission rate thereof ends up being restricted. For this reason, the method of flexibly changing the used frequency band in accordance with the required transmission rate is being studied.

Further, when considered by the mobile communications system as a whole, the state of usage differs for each used frequency band. Sometimes a band is not used at all. For this reason, from the viewpoint of the effective utilization of the frequency, it has been studied to make the used frequency band variable.

Under this situation, technology of making the used frequency band variable in an MC (Multi-Carrier)-CDMA (Code Division Multiple Access) or OFDM (Orthogonal Frequency Division Multiplex) or other multicarrier transmission mobile communications system has been proposed. For example, the methods disclosed in the following four Patent Documents 1 to 4 are proposed. Details thereof will be explained later with reference to the drawings, but these may be summarized as follows:

1) A "multiple connection method and apparatus" disclosed in Patent Document 1 is characterized by dividing a series of subcarriers so as to freely assign used frequency bands to users.

2) A "mobile station, base station, and mobile communications network" disclosed in Patent Document 2 are characterized in that a subcarrier band dedicated to transmission of control signals is set in the communications network.

3) A "channel allocation method" disclosed in Patent Document 3 is characterized by changing the number of subcarriers in the series of subcarriers in accordance with length of the communications distance between the base station and the mobile station.

4) A "wireless transmission apparatus and wireless communications method" disclosed in Patent Document 4, is characterized by changing the bandwidth of each subcarrier in the series of subcarriers to make the bandwidth of the used frequency band variable.

[Patent Document 1] Japanese Patent Publication (A) No. 9-205411
[Patent Document 2] Japanese Patent Publication (A) No. 2003-264524
[Patent Document 3] Japanese Patent Publication (A) No. 2004-21476
[Patent Document 4] Japanese Patent Publication (A) No. 2002-330467

SUMMARY OF THE INVENTION

The prior arts based on the above four Patent Documents 1 to 4 involve the following problems:

1) In Patent Document 1 (Japanese Patent Publication (A) No. 9-205411), information on the used subcarrier is not transmitted, therefore the reception side must receive all subcarriers and decode them. This is inefficient.

2) In Patent Document 2 (Japanese Patent Publication (A) No. 2003-264524), information on the used subcarrier is transmitted, but it is necessary to receive, demodulate, and decode a common control channel for transmitting this subcarrier information.

Further, when multiplexing users, the information needed by the user must be extracted from data transmitted over the common control channel. Further, information directed to each user is contained in that common control channel, therefore the bandwidth might become insufficient at a low transmission rate. Furthermore, the common control channel is common to all users, therefore changing the used subcarrier will end up having an effect on all users. Accordingly, the subcarrier of that common control channel cannot be easily changed.

3) In Patent Document 3 (Japanese Patent Publication (A) No. 2004-214746), the bandwidth of the data channel is made variable, but the common control channel still uses a fixed frequency band common to all users, so there is the same problem as that of Patent Document 2.

4) In Patent Document 4 (Japanese Patent Publication (A) No. 2002-330467), when considering the use of user multiplexing, in order to suppress interference due to the transmissions for many users, it is necessary to further perform code multiplexing among users. However, if the bandwidths of the subcarriers become different among users, the orthogonality of codes will be deteriorated and will end up becoming a cause of interference.

In order to prevent this interference, where a certain user changes the bandwidth of the subcarrier, the other users must also change the bandwidths of the subcarriers to match with that. As a result, the bandwidths of the subcarriers are broadened due to the user in a poor transmission situation, so the transmission efficiency is lowered. Accordingly, there is the inconvenience that changing the bandwidth of the subcarrier sometimes will not be an effective means.

Accordingly, in consideration with the above problems, an object of the present invention is to provide a communications system (mobile communications system) able to freely and easily extend, reduce, or change the used frequency band of each user within the overall frequency band allocated to the communications system and preventing the above extension, reduction, or change from having an effect on other users, more particularly a communications apparatus (base station and/or terminal) for this purpose.

According to the present invention, as will be explained in detail later by using the drawings, a specific frequency band is first set from among a plurality of frequency bands obtaining by dividing the overall frequency band allocated to the communications system. Then, that specific frequency band is used to transmit "used frequency band information" determining which of the remaining frequency bands is to be used between communications apparatuses from one communications apparatus to another communications apparatus. Further, that specific frequency band is set as a "main band" in the above overall frequency band. This main band transmits the above "used frequency band information" plus "data information (user data)". Further, among the above plurality of frequency bands, at least one frequency band set from among the frequency bands other than the above "main band" is defined as an "extension band". This extension band is mainly used for transmitting further data information and can deal with an increase of amount of data. Accordingly, this extension band is set according to need. However, the above main band is always set at the time of establishment of a wireless channel. In addition, this main band transmits not only the above "used frequency band information", but also the inherent "data information" (user data) within a range permitted by the transmission capacity. Further, this main band can include also general "control information" (user control information). Due to this, the above problems are solved.

BRIEF DESCRIPTION OF THE DRAWINGS

FIG. 14A and FIG. 14B are views showing an example of the hardware configuration on the transmission side of pilot signals.

FIG. 15A and FIG. 15B are views showing an example of the hardware configuration on a return side of response (CQI) information to a pilot signal.

FIG. 26 is a view showing a table for explaining high efficiency transmission of the used frequency band information.

BEST MODE FOR CARRYING OUT THE INVENTION

First of all, to speed the understanding of the present invention, the prior arts (Patent Documents 1 to 4) explained above will be explained with reference to the drawings.

Figure 34:
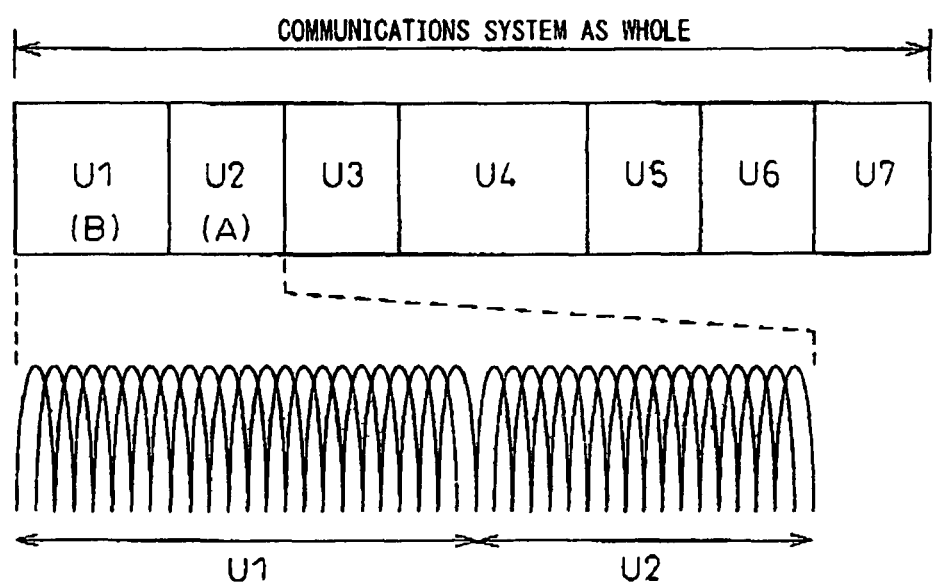
FIG. 34 is a view showing the gist of the art disclosed in Patent Document 1.

FIG. 34 is a view showing the gist of the prior art disclosed in Patent Document 1. The figure shows the allocation of frequencies to for example seven users U1 to U7 (top part). The bottom parts shows details of the allocation of a series of subcarrier to the users U1 and U2. The abscissa is the frequency.

The present system is characterized by consecutively arranging a plurality of carriers for the frequency bands allocated at the transmission side, dividing them into a plurality of subcarriers in accordance with the users (U1 to U7), and consecutively arranging these.

Specifically, for example, the overall frequency band able to be used in one communications system is set as 20 MHz, and 250 subcarriers are set there. Accordingly, the bandwidth of each subcarrier becomes 20 MHz/250=80 kHz. Then, these 250 subcarriers are used while being dynamically allocated among the plurality of users (U1 to U7).

At this time, for example, the subcarriers are dynamically allocated, for example, 50 subcarriers are allocated to a user A (U2) and 75 subcarriers are allocated to another user B (U1), to make the number of subcarriers used variable.

Along with that, the used frequency band becomes 50×80 kHz=4 MHz for the user A and becomes 75×80 kHz=6 MHz for the user B. That is, the used frequency band is made variable for each user. In this case, it is assumed that the allocated subcarriers are consecutive on the frequency axis. Note that it is also possible to further make the sizes of the divisions of the frequency band variable.

Figure 35:
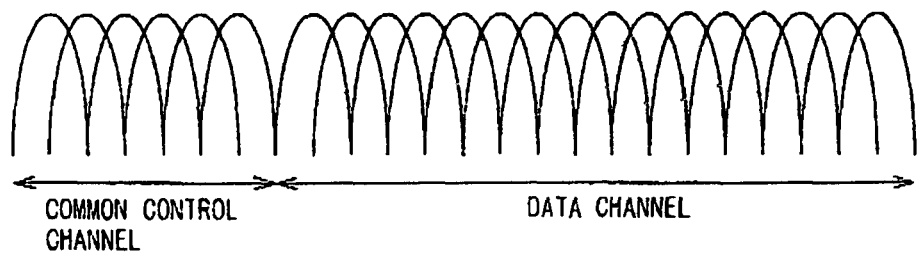
FIG. 35 is a view showing the gist of the art disclosed in Patent Document 2.

FIG. 35 is a view showing the gist of the prior art disclosed in Patent Document 2. The figure is a view showing the state of allocation of the common control channel and the data channel on the frequency axis.

In the present system, in a multicarrier CDMA system, the subcarriers dedicated to the transmission of the control signal and the subcarriers dedicated to the transmission of data (data channel) are separately set. The common control channel thereof is spread by a unique spread code. Accordingly, when this common control channel is received, it is sufficient to demodulate specific subcarriers, so the amount of signal processing thereof can be reduced.

Figure 36:
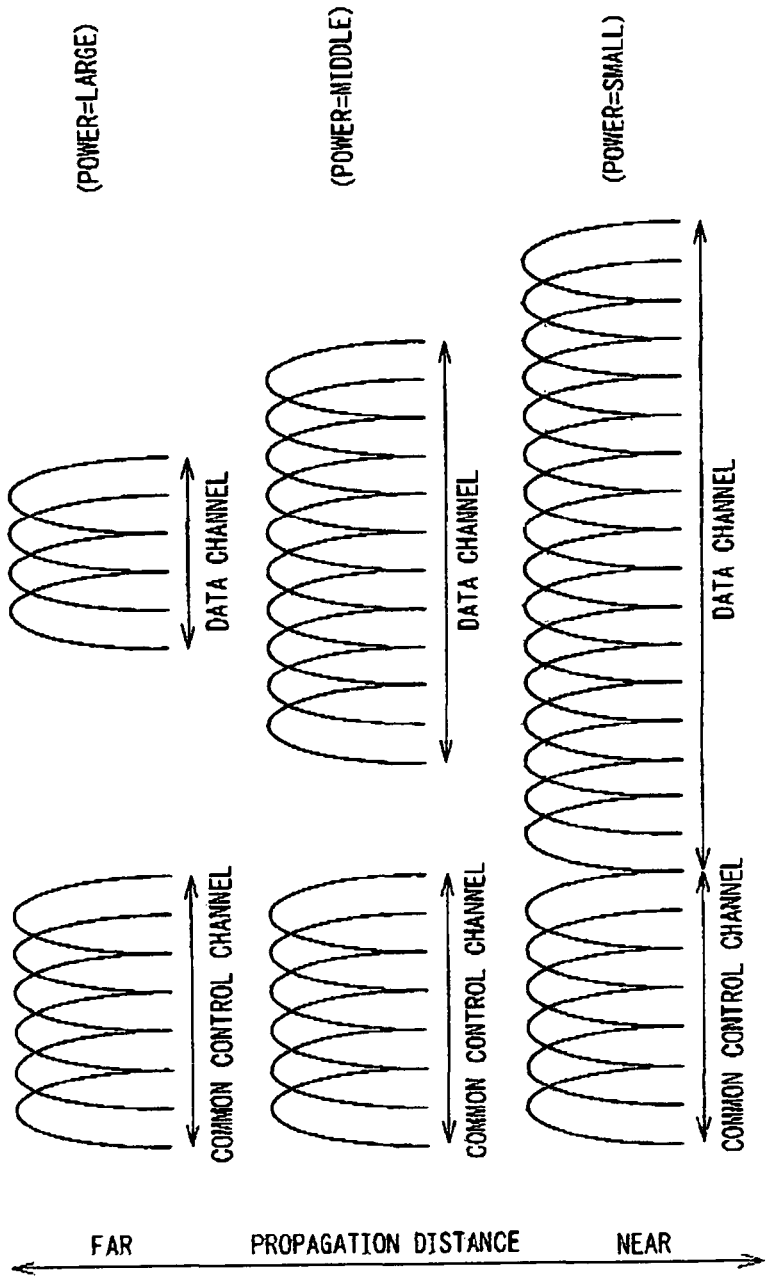
FIG. 36 is a view showing the gist of the art disclosed in Patent Document 3.

FIG. 36 is a view showing the gist of the prior art disclosed in Patent Document 3. The figure shows making the frequency band of the data channel in FIG. 35 described above variable in accordance with a propagation distance (communication distance with the base station). Note that the transmission power is changed (large—medium—small).

The present system is a system for realizing variable speed communication by making the transmission rate per subcarrier fixed and making the number of subcarriers allocated to the user variable. When the distance between the base station and the terminal is short, the transmission power of each subcarrier is made small and many subcarriers are allocated, while when that distance is long, the transmission power of each subcarrier is made large and a small number of subcarriers are allocated.

Further, the number of subcarriers used for the common control channel is made small, while a large number of subcarriers are allocated with respect to the data communications use channel (data channel). The two are completely separately arranged along the frequency axis. Note that the subcarriers dedicated to the common control channel are used to notify the center subcarrier number of the subcarriers allocated for the data channel and the number of used subcarriers from the base station to the mobile station.

Figure 37:
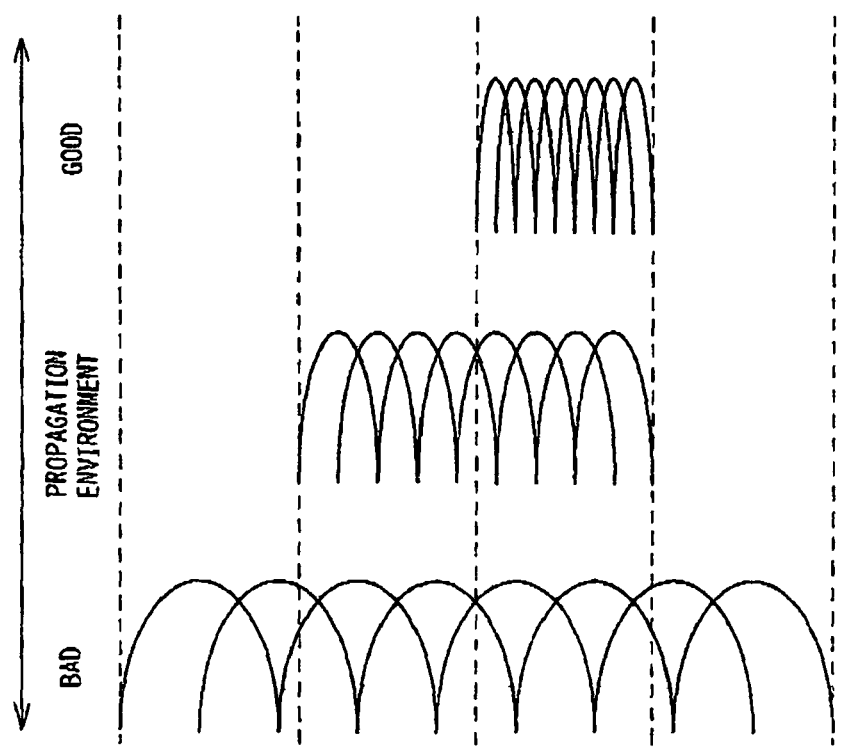
FIG. 37 is a view showing the gist of the art disclosed in Patent Document 4.

FIG. 37 is a view showing the gist of the prior art disclosed in Patent Document 4. The figure shows that the bandwidth of each subcarrier is made variable in accordance with whether or not the propagation environment is good.

The present system changes the bandwidth of each subcarrier while making a total number of subcarriers constant in accordance with the condition of the propagation environment in wireless transmission. For example, when the propagation condition becomes poor, the band of each subcarrier is made wider. Due to this, the transmission can be carried out without changing the total subcarriers, therefore the transmission rate can be maintained constant without regard to the propagation environment.

The present invention solves the already explained problems of the prior arts (Patent Documents 1 to 4) explained with reference to FIG. 34 to FIG. 37 explained above. This will be explained in detail below with reference to the drawings.

Figure 1:
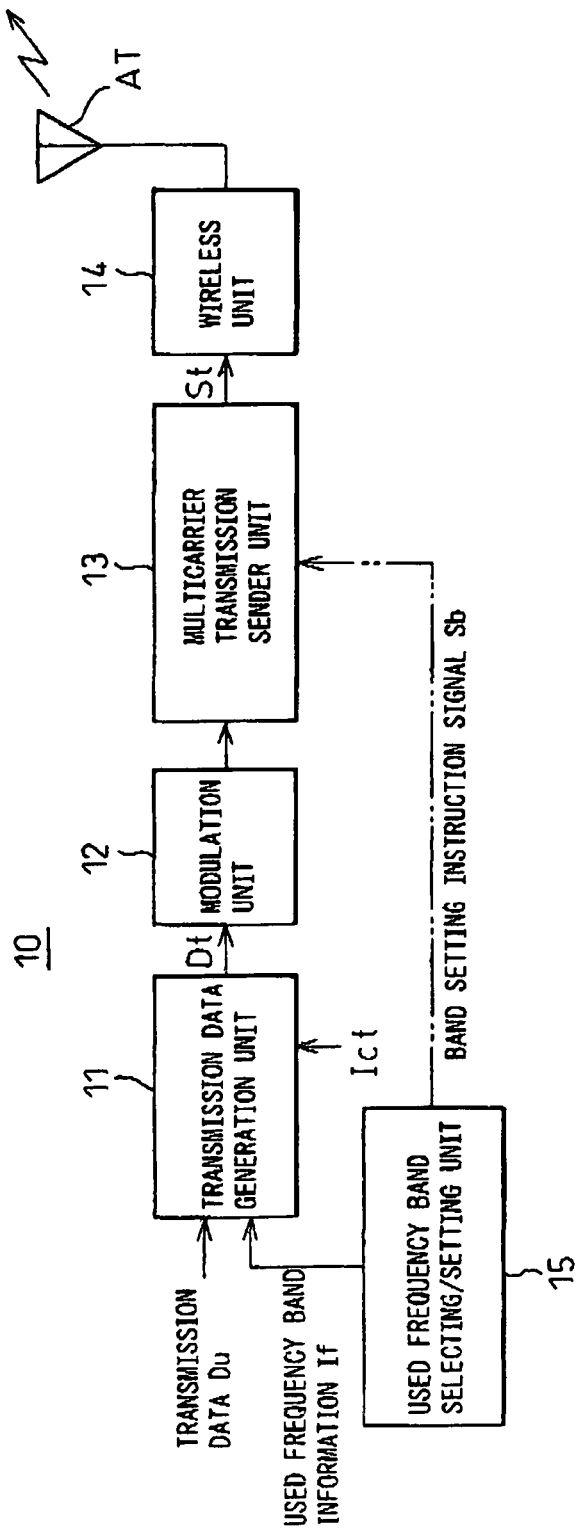
FIG. 1 is a view showing the basic configuration of a communications apparatus (transmission side) according to the present invention.
Figure 2:
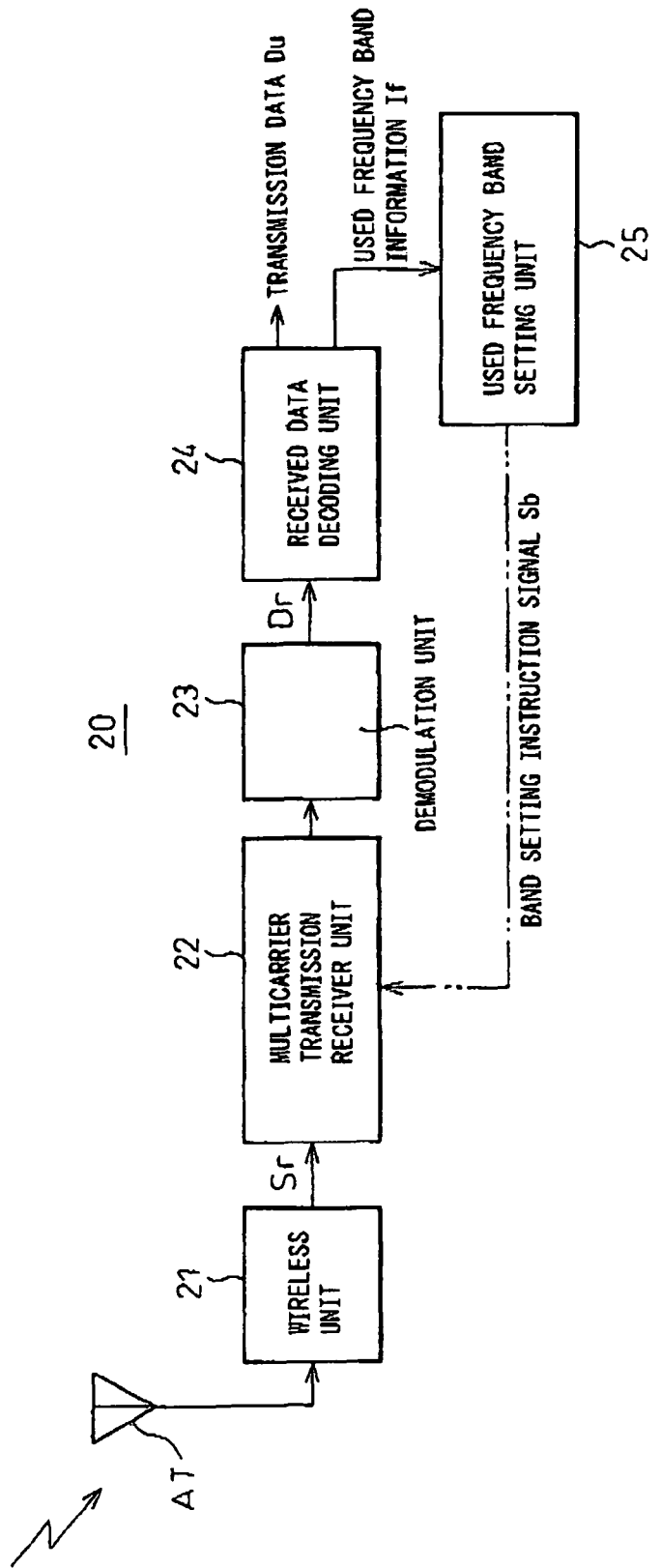
FIG. 2 is a view showing the basic configuration of a communications apparatus (reception side) according to the present invention.

FIG. 1 is a view showing the basic configuration of a communications apparatus (transmission side) according to the present invention, and FIG. 2 is a view showing the basic configuration of a communications apparatus (reception side) according to the present invention.

In FIG. 1, reference numeral 10 indicates the communications apparatus (transmission side), and in FIG. 2, reference numeral 20 indicates the communications apparatus (reception side). These are accommodated in the same communications system (mobile communications system). Note that as already explained, the communications apparatus 10 may be a base station and the communications apparatus 20 may be a terminal, or vice versa. The present invention can be applied to both cases, but for easier understanding, in the following explanation, the communications apparatus 10 on the transmission side will be assumed as the base station, and the communications apparatus 20 on the reception side will be assumed as a terminal unless otherwise indicated.

First, referring to FIG. 1, the selection function in particular of a used frequency band selecting/setting unit 15 is used to select the used frequency band to be used with the other communications apparatus 20. The "used frequency band information" If (frequency) according to this selection is input to a transmission data generation unit 11 where transmission data Dt (transmission) combined integrally with transmission data (user data) Du (user) to be transmitted to the communications apparatus 20 is generated. Accordingly, the transmission data Dt includes the transmission data Du and the used frequency band information If, but in actuality further includes also other "communication control information" Ict (control). This information Ict is the information concerning a used modulation scheme for example QAM and information etc. concerning a one time transmission data amount of the transmission data Du.

The above transmission data Dt is modulated in a predetermined way at a modulation unit 12, then input to the next multicarrier transmission sender unit 13. This sender unit 13 is supplied with a band set instruction signal Sb (band) instructing processing for transmission at the above selected used frequency band by the setting function of the above used frequency band selecting/setting unit 15. The sender unit 13 performs the processing for signal transmission by multicarrier transmission at the frequency band based on this signal Sb.

Further, a wireless unit 14 converts the frequency conversion of the transmission data signal St from the above sender unit 13 and transmits this from the next antenna AT toward another communications apparatus (terminal) 20.

On the other hand, referring to FIG. 2, the wireless signal from the above antenna AT (FIG. 1) is received at the antenna AT (FIG. 2) and further converted in frequency by a wireless unit 21 to be a received data signal Sr which is then input to a multicarrier transmission receiver unit 22. This receiver unit 22 processes the received data signal Sr for signal reception according to the multicarrier transmission, then the next demodulation unit 23 demodulates the signal after the signal reception processing.

The demodulated received data Dr is decoded at a received data decoding unit 24 and separated to the original transmission data Du and the previously set used frequency band information If explained before. Further, the above communication control information Ict is also separated from that data Dr. Note that the units to be controlled according to this information Ict are not directly related to the gist of the present invention, so explanations are omitted.

As explained above, the original used frequency band information If obtained by separation from the received data Dr is input to a used frequency band setting unit 25. The setting unit 25 receives this information If and reproduces the above band set instruction signal Sb. This signal Sb is supplied to the above multicarrier transmission receiver unit 22, then this receiver unit 22 performs processing for signal reception according to the multicarrier transmission by using the frequency band selected on the transmission side. Note that the previously determined frequency band may be selected in the initial stage of establishment of the wireless channel.

In the present invention, the transmission side (10) and the reception side (20) can use the same used frequency band by the above-explained band set instruction signal Sb. Further, based on that signal Sb, that used frequency band can be simultaneously extended, reduced, or changed at both of the transmission side (10) and the reception side (20). Thus, the object of the present invention explained before can be achieved.

The basic configuration of the present invention explained above will be explained a little more concretely in comparison with the above prior arts.

In the present invention, the frequency band usable in the communications system as a whole is divided into a plurality of bands. For example, when the used frequency band of the communications system as a whole is set as 20 MHz, it is divided into four bands of 5 MHz each. One band 5 MHz is used to transmit the information of the control channel for transmitting the used frequency band information and the transmission channel (data channel) for transmitting the transmission data.

According to the present invention, as explained before, the frequency band for transmitting at least the control channel is defined as the "main band" and a further extended frequency band is defined as an "extension band". For example, when considering this in an OFDM communications system, 100 subcarriers are included in one band 5 MHz, the bandwidth of each subcarrier is 50 kHz, and the information of the control channel and the data channel are transmitted by using the series of these 100 subcarriers. The two information may be multiplexed by time division multiplexing, frequency division multiplexing, or code division multiplexing.

As explained above, unlike Patent Document 3 (Japanese Patent Publication (A) No. 2004-214746), the information of the "main band" is received and decoded to learn the used frequency band (or number of used frequency bands), therefore, the used frequency band can be easily extended, reduced, and changed. Further, due to this, unlike Patent Document 1 (Japanese Patent Publication (A) No. 9-205411) and Patent Document 3 (Japanese Patent Publication No. 2004-214746), the configuration of the reception unit is simplified.

Further, if making the number of subcarriers per frequency band constant, the number of subcarriers will change with a ratio of a whole number along with a change of the number of used frequency bands. Accordingly, when compared with Patent Document 3 (Japanese Patent Publication (A) No. 2004-214746) in which the subcarriers dynamically change, the configuration of the reception unit is simplified.

Further, by designating the used frequency band from the base station to the terminals in advance, the extension band described above can be easily changed and added to and even the main band can be changed.

Further, if making the bandwidth of each subcarrier fixed as explained above, the used frequency band can be changed without influencing other users as in Patent Document 4 (Japanese Patent Publication (A) No. 2002-330467). Various embodiments according to the present invention will be explained below.

[Embodiment 1: Setting of Used Frequency Band]

First, describing some characteristic features disclosed in the present Embodiment 1, these are as follows. The principal points of these characteristic features are as already described and reside in the following three points (i) to (iii):

(i) A specific frequency band from among a plurality of frequency bands formed by dividing the overall frequency band allocated to a communications system is set, and that specific frequency band is used to transmit "used frequency band information" If determining which remaining frequency band is to be used between communications apparatuses (10, 20), (ii) that specific frequency band is set as a "main band" in the overall frequency band, and that main band transmits, in addition to the used frequency band information If, data information Du, and (iii) among the above-explained plurality of frequency bands, at least one frequency band set from among the frequency bands other than above "main band" is defined as an "extension band", and that extension band mainly transmits further data information (Du).

Next, some principal points further disclosed in the present Embodiment 1 reside in the following four points (iv) to (vii):

(iv) The above "main band" is set fixedly at the time of the establishment of the wireless channel between the communications apparatuses (10, 20), (v) when there are a plurality of communications apparatuses (20), "main bands" are individually set for the above plurality of frequency bands and, at the same time, main bands are individually assigned corresponding to these plurality of communications apparatuses (20), (vi) two or more communications apparatuses (20) can simultaneously use the same "main band" by time division multiplexing and/or code division multiplexing, and (vii) further, the number of extension bands is changed in accordance with the predetermined transmission rate of the data information (Du).

Figure 3:
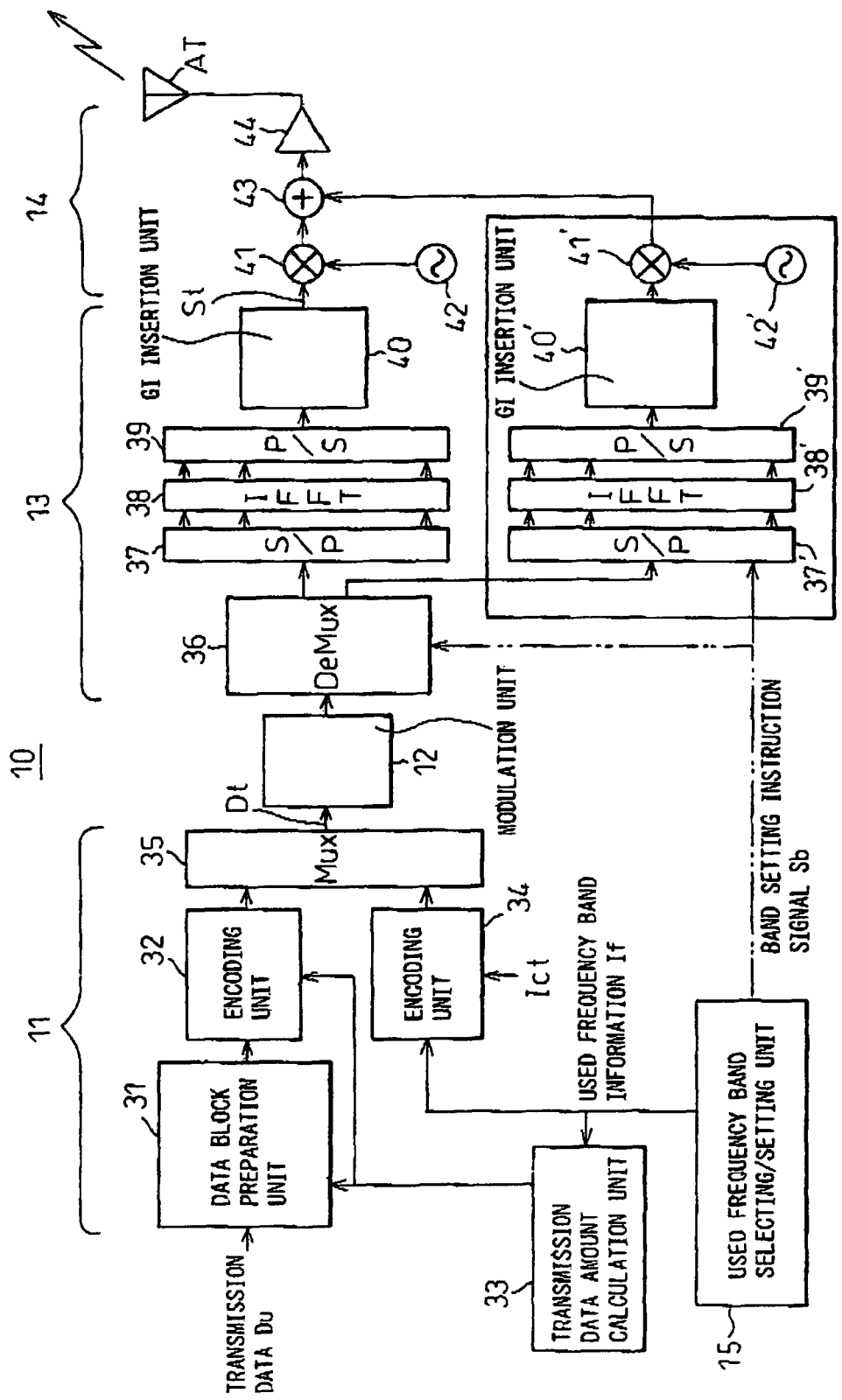
FIG. 3 is a view showing a concrete example of a communications apparatus (transmission side) 10 according to the present invention.
Figure 4:
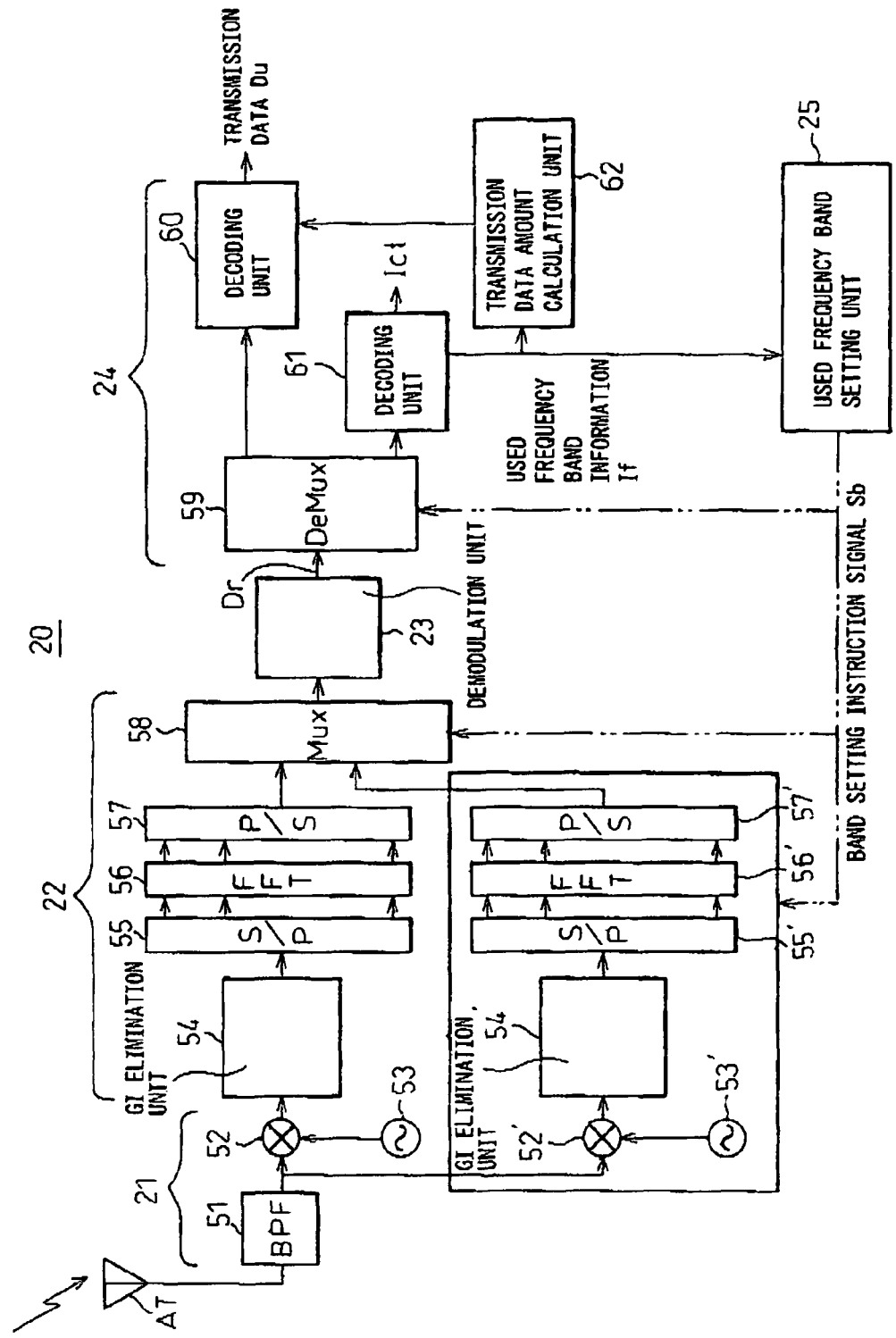
FIG. 4 is a view showing a concrete example of a communications apparatus (reception side) 20 according to the present invention.

FIG. 3 is a view showing a concrete example of the communications apparatus (transmission side) 10 according to the present invention, and FIG. 4 is a view showing a concrete example of the communications apparatus (reception side) 20 according to the present invention. Note that, same components will be indicated by same reference numerals or symbols throughout all of the figures. Further, the concrete examples shown in FIG. 3 and FIG. 4 are not only applied to the present Embodiment 1, but also commonly applied to the other Embodiments 2 to 10 explained later.

Referring to the communications apparatus (transmission side) 10 first, the parts corresponding to the components 11 to 15 and Du, Dt, St, and Sb shown in FIG. 1 are shown assigned these reference numerals or symbols 11 to 15 and Du, Dt, St, and Sb.

The transmission data generation unit 11 is configured by a data block preparation unit 31, an encoding unit 32, a transmission data amount calculation unit 33, an encoding unit 34, and a multiplexing unit (Mux) 35 according to the example of the present figure.

Based on the used frequency band information If from the above used frequency band selecting/setting unit 15, the transmission data amount calculation unit 33 first calculates a transmission data length, then the data block preparation unit 31 prepares data blocks for each transmission data length. Further, the encoding unit 32 encodes the transmission data by using that transmission data length.

The above used frequency band information If is encoded together with the communications control information Ict indicating the used modulation scheme etc. at the encoding unit 34. Note that the encoding units 32 and 34 may encode Du and If all together as one encoding unit.

The encoded outputs from the two encoding units 32 and 34 are multiplexed at the multiplexing unit (Mux) 35 and become the already explained transmission data Dt. This data Dt is further modulated at the modulation unit 12 as explained before. As the method of this multiplexing, there are frequency division multiplexing separating subcarriers and using the same, time division multiplexing (by using for example a frame format shown in FIG. 16), code division multiplexing etc. Further, as the modulation scheme by the modulation unit 12, there are QPSK, 16QAM, 64QAM, etc.

Figure 7:
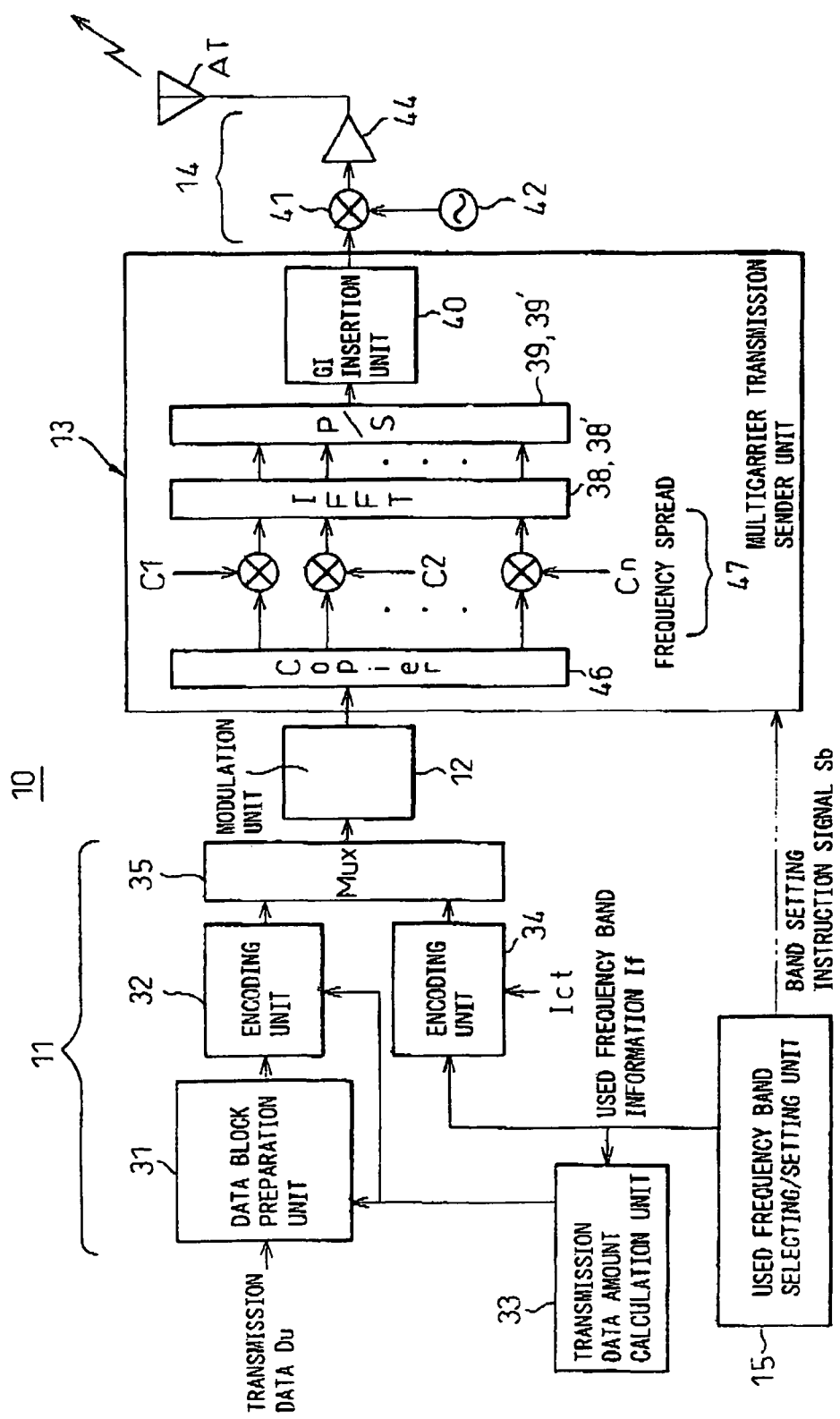
FIG. 7 is a view showing another modification of the communications apparatus (transmission side) 10 according to the present invention.
Figure 8:
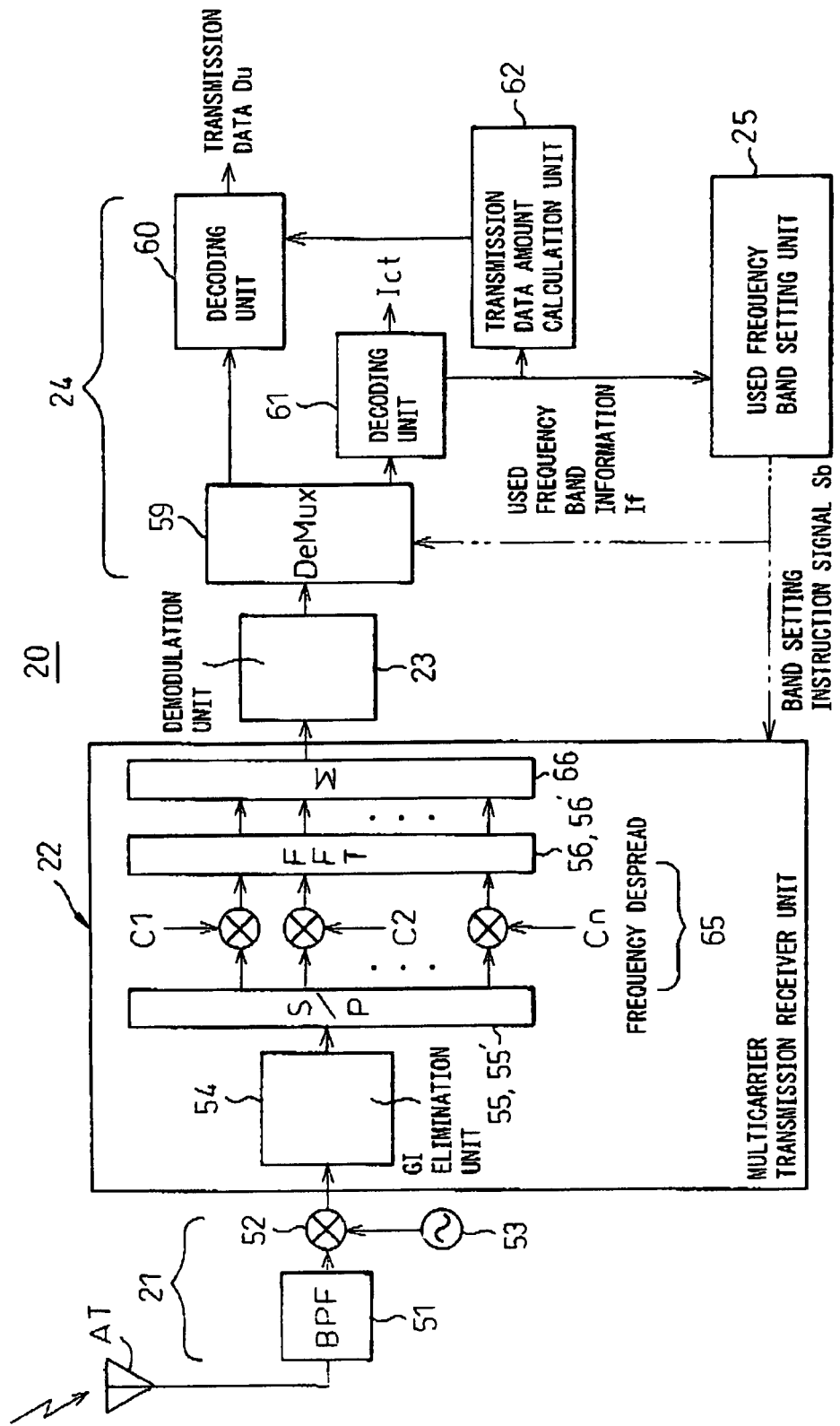
FIG. 8 is a view showing another modification of the communications apparatus (reception side) 20 according to the present invention.

Next, when looking at the multicarrier transmission sender unit 13, in the example shown in the present figure, this is configured by components 36, 37, 38, 39, and 40. Note that this is shown as an example based on communications according to OFDM. Another example based on communications according to MC-CDMA is shown in FIG. 7 (FIG. 8).

The demultiplexing unit (DeMux) 36 demultiplexes this into the information belonging to the "main band" and the information belonging to the "extension bands". The information belonging to the "main band" is converted to a parallel signal at a serial/parallel converter (S/P) 37, then a time-frequency transform is applied to the parallel signal at an Inverse Fast Fourier Transform unit (IFFT) 38. The parallel signal transformed into frequency is converted to a serial signal again at a parallel/serial converter (P/S) 39. Further, a guard interval (GI) insertion unit 40 inserts a guard interval GI into the serial signal for preventing inter-symbol interference.

The thus obtained transmission data signal St is input to the wireless unit 14. This wireless unit 14 is, according to the example of the present figure, configured by a general mixer 41, a local oscillator 42, and a power amplifier 44 (a D/A converter, a filter, etc. are omitted) and transmits the transmission data signal St from the antenna At. In this case, an adder unit 43 is provided in the middle.

The adder unit 43 applies the same processing as the processing for the "main band" by the above-explained components 37, 38, 39, 40, 41, and 42 with respect to the information belonging to the above "extension bands" demultiplexed at the demultiplexing unit (DeMux) 36 as explained before by the components 37', 38', 39', 40', 41', and 42', obtains the transmission data signal St on the "extension band" side, and combines the same together with the already explained transmission data signal St on the "main band" side.

The transmission data on the "extension band" side described above is generated only when data transmission by the "extension bands" is needed. Whether or not it is needed is determined according to the band set instruction signal Sb from the already explained selecting/setting unit 15.

Referring to FIG. 4 next, parts corresponding to the components 21 to 25 and Sr, Dr, Du, If, and Sb shown in FIG. 2 are shown assigned the reference numerals 21 to 25 and symbols Sr, Dr, Du, If, and Sb.

The wireless unit 21, according to the example of the present figure, eliminates an undesired band of a signal in the signal received from the antenna AT by a band pass filter (BPF) 51, converts the remainder to a predetermined reception frequency by the mixer 52 and the local oscillator 53, and thereby obtains the received data signal Sr.

This received data signal Sr is input to the multicarrier transmission receiver unit 22 and processed. This receiver unit 22 is, according to the example of the present figure, configured by the components 54, 55, 56, 57, and 58.

First, the guard interval (GI) elimination unit 54 eliminates the guard interval inserted at the transmission side. The signal after the GI elimination is further converted to a parallel signal at the serial/parallel converter (S/P) 55. The Fast Fourier Transform unit (FFT) 56 applies a frequency-time transform to the parallel signal. The time transformed parallel signal is converted to a serial signal again at the parallel/serial converter (P/S) 57.

On the other hand, when the signal received from the antenna AT contains information belonging to an "extension band", the mixer 52' and the local oscillator 53' extract the signal of the "extension band" and apply the same processing as the processing by the above-explained components 55 to 57 by the same components S/P 55', FFT 56', and P/S 57' to obtain a time-transformed serial signal.

The serial signals from the above parallel/serial converters 57 and 57' are multiplexed at the multiplexing unit (Mux) 58 and further demodulated at the demodulation unit 23. Note that when only information belonging to the "main band" is transmitted, the above multiplexing unit 58 does not perform the multiplexing, but only passes the signal therethrough.

The signal from the multiplexing unit 58 becomes the received data Dr demodulated at the next demodulation unit 23, then is input to the received data decoding unit 24. This decoding unit 24 is, according to the example of the present figure, configured by a demultiplexing unit (DeMux) 59, a data channel decoding unit 60, a control channel decoding unit 61, and a transmission data amount calculation unit 62.

The above demultiplexing unit 24 demultiplexes the received data Dr to data channel side data and control channel side data and distributes these to the decoding unit 60 and the decoding unit 61. From the decoding unit 60, the original transmission data Du is reproduced based on the transmission data amount explained later. On the other hand, from the decoding unit 61, the "used frequency band information" If is reproduced.

The above information If from the decoding unit 61 is input to the transmission data amount calculation unit 62 on the one hand, the data length of the received transmission data is calculated here based on that If, and the transmission data is decoded by the above decoding unit 60 based on this data length.

The above information If from the decoding unit 61 is given to the already explained used frequency band setting unit 25 on the other hand, where the above band set instruction signal Sb is generated. Then, according to the content of this signal Sb, the circuit portions (22, 58, 59) are set corresponding to the selected frequency band by the shown dotted line route. Note that the received data decoding unit 24 of FIG. 4 may be configured so that the received data Dr is input to one decoding unit (making the decoding units 60 and 61 common) at first and decoded, then demultiplexed to the data channel and the control channel at the demultiplexing unit 59.

In the configuration of FIG. 3 and FIG. 4 explained above, the frequency band of the "main band" is fixed, and only the frequency bands of the "extension bands" are variable. However, in a certain embodiment of the present invention, not only the "extension bands", but also the "main band" can be made variable in frequency bands. An example of a configuration accomplishing this is shown in the drawings.

Figure 5:
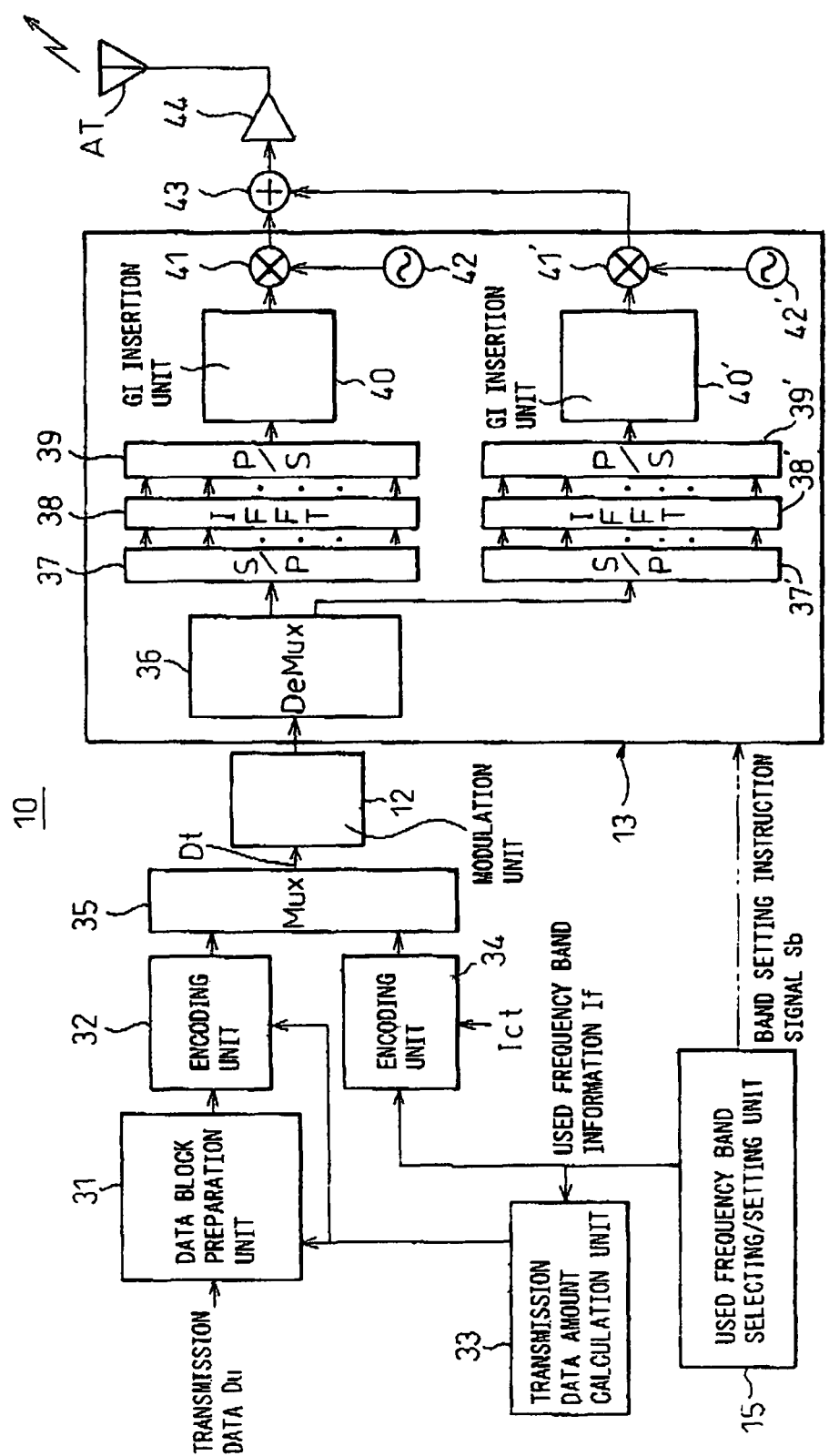
FIG. 5 is a view showing a modification of the communications apparatus (transmission side) 10 according to the present invention.
Figure 6:
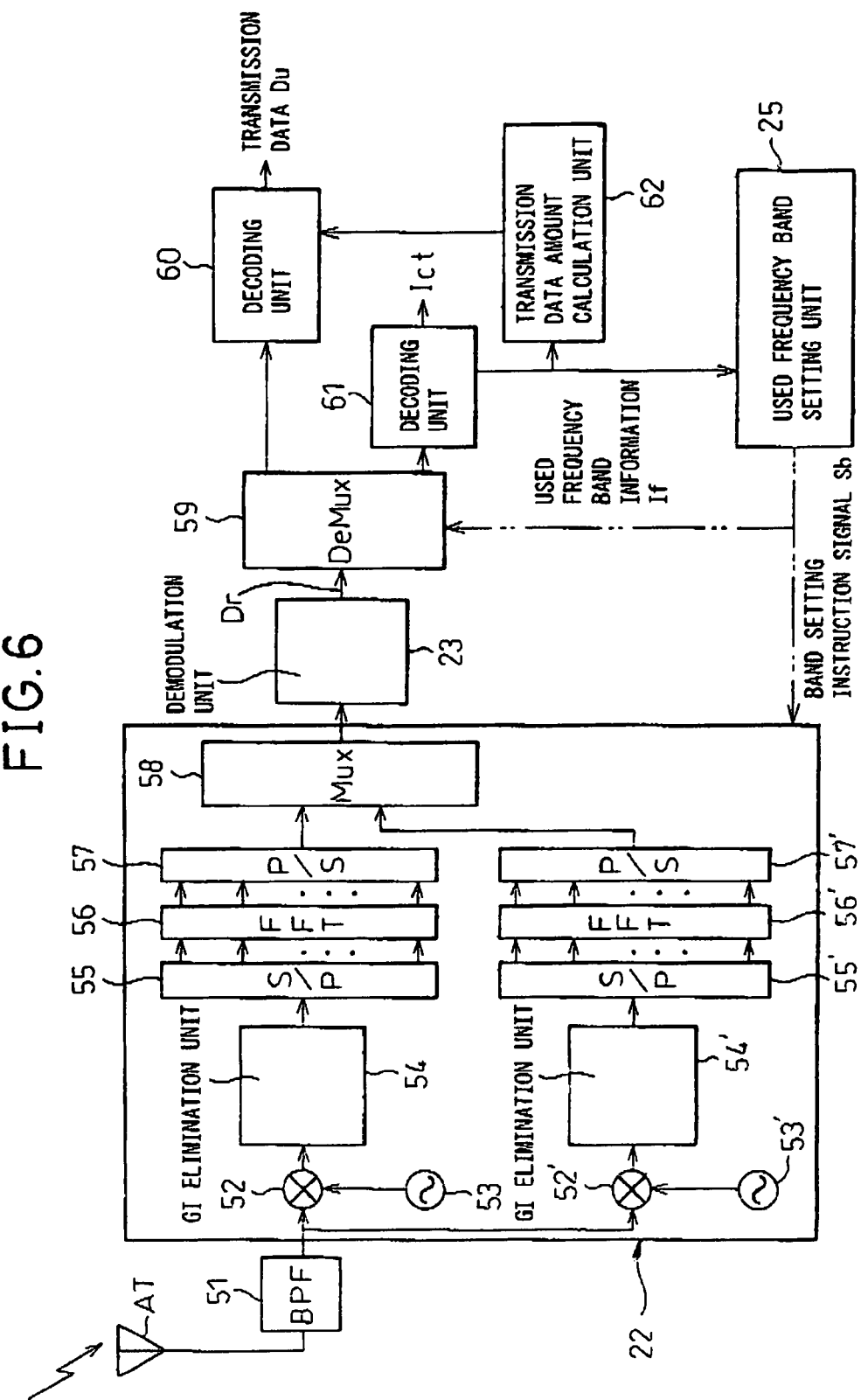
FIG. 6 is a view showing a modification of the communications apparatus (reception side) 20 according to the present invention.

FIG. 5 is a view showing a modification of the communications apparatus (transmission side) 10 according to the present invention, and FIG. 6 is a view showing a modification of a communications control device (reception side) 20 according to the present invention.

The difference between the configuration shown in these FIG. 5 and FIG. 6 and the configuration shown in FIG. 3 and FIG. 4 explained before resides in that, in FIG. 5, the scope of instruction by the band set instruction signal Sb from the used frequency band selecting/setting unit 15 reaches not only the "extension band" side (37' to 42') (case of FIG. 3), but also the "main band" side (37 to 42). Further, the difference resides in that, in FIG. 6, the scope of instruction by the band set instruction signal Sb from the used frequency band setting unit 25 reaches not only the "extension band" side (52' to 57') (case of FIG. 4), but also the "main band" side (52 to 57). Thus, the change of the frequency band of the "main band" also becomes possible.

Further, the explanation of the concrete example explained above was predicated on communications by OFDM, but other than this, it is also possible to explain it based on communications according to the MC-CDMA. Also, an example of the communications apparatus in this latter case (MC-CDMA base) is shown here.

FIG. 7 is a view showing another modification of the communications apparatus (transmission side) 10 according to the present invention, and FIG. 8 is a view showing another modification of the communications apparatus (reception side) 20 according to the present invention.

For example, when comparing the above FIG. 5 and FIG. 6 and the present FIG. 7 and FIG. 8, on the transmission side (10), the configuration of the multicarrier transmission sender unit 13 is different, and on the reception side (20), the configuration of the multicarrier transmission receiver unit 22 is different.

Namely, in the sender unit 13 shown in FIG. 7, the difference resides in the point that a copier unit 46 and a multiplication unit 47 are used. Further, in the receiver unit 22 shown in FIG. 8, the difference resides in the point that a multiplication unit 65 and a combining unit (Σ) 66 are used.

First, the transmission operation will be explained by using FIG. 7. The generated transmission data is modulated and copied by the number of subcarriers at the copier unit 46. The multiplication unit 47 multiplies the copied signals by spread codes (C1, C2 . . . Cn). The IFFT units (38, 38') apply IFFT to the results to apply a time-frequency transform. Then, the GI insertion unit 40 inserts a GI, then the signal is converted in frequency and transmitted from the antenna AT. Further, the setting of the multicarrier transmission sender 13 is changed based on the used frequency band selected at the used frequency band selection unit 15.

Next, a reception operation will be explained by using FIG. 8. First, the received signal is frequency converted to obtain a base band signal, then the GI is eliminated at the GI elimination unit 54. Next, the signal is converted from a serial to parallel format (55, 55'), and each of the parallel signals is multiplied by the spread codes (C1, C2 . . . Cn) at the multiplication unit 65 and despread. The results thereof are subjected to FFT at the FFT units (56, 56'), a frequency-time transform is carried out, then the results are summed up at the combining unit 66. The result of this is demodulated at the demodulation unit 23. Below, the same processing as that explained before is carried out to extract the used frequency band information If. Then, based on the extracted used frequency band information If, the setting of the multicarrier transmission receiver unit 22 is changed. Note that, in FIG. 7 and FIG. 8, when the used frequency band is changed, the number n of codes the frequency spread may be made variable. When MC-CDMA is used as described above, the hardware configuration can be simplified in comparison with the OFDM. Further, on the other hand, there arises a necessity of making the number of point of FFT and IFFT dynamically variable, so the control becomes complex.

Below, the present Embodiment 1 will be further explained with reference to the arrangement of the frequency bands.

A communications system able to change the used frequency band using OFDM etc. transmits the used frequency band information If by using a specific frequency band. Then, by demodulating and decoding the specific frequency band, the used frequency band If can be obtained. By this information If, the communications in an extension band become possible. This is based on division of the overall frequency band as follows in the present invention.

Figure 9:
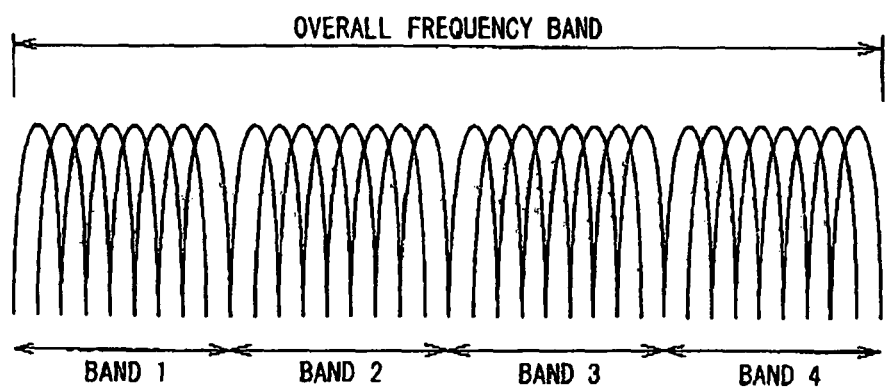
FIG. 9 is a view showing the pattern of frequency division in a communications system.

FIG. 9 is a view showing the pattern of frequency division in a communications system. The series of subcarriers of the present figure show the overall frequency band assigned to the communications system. This overall frequency band is divided into a plurality of frequency bands. In the present figure, the example of division into four is shown, that is, the band is divided into four frequency bands, that is, "BAND 1", "BAND 2", "BAND 3", and "BAND 4". Then, any of these "BAND 1" to "BAND 4" is selected and defined as the above "main band", while another band is selected and defined as an above "extension band".

Figure 10:
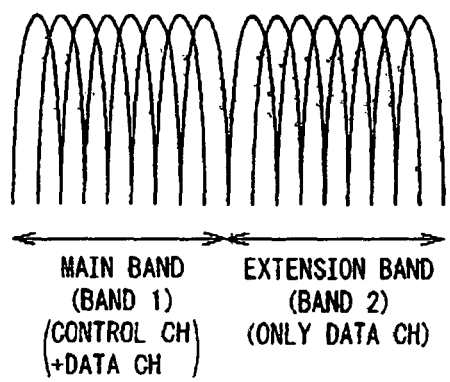
FIG. 10 is a view showing a state of selecting one "main band" and "extension band" each.

FIG. 10 is a view showing the state of selecting one "main band" and one "extension band". For example the above band 1 is selected as the "main band", and for example the above band 2 is selected as an "extension band". As explained before, the "main band" is assigned to the transmission of the control channel (CH) and the data channel (CH), and the "extension band" is assigned to the further transmission of the data channel. The main band used by a certain terminal is determined by for example the base station or the higher base station controller. Alternatively, converse to this, the main band may be designated from the terminal side to the base station side.

The above main band may be fixed in advance in the communications system or may be set at the time of establishment of a wireless channel between communications apparatuses (base station and terminal). The setting may be fixed until the communication is completed.

Further, when there are a plurality of communications apparatuses (user terminals), a different main band may be set for each user terminal. This situation will be shown in the figure.

Figure 11:
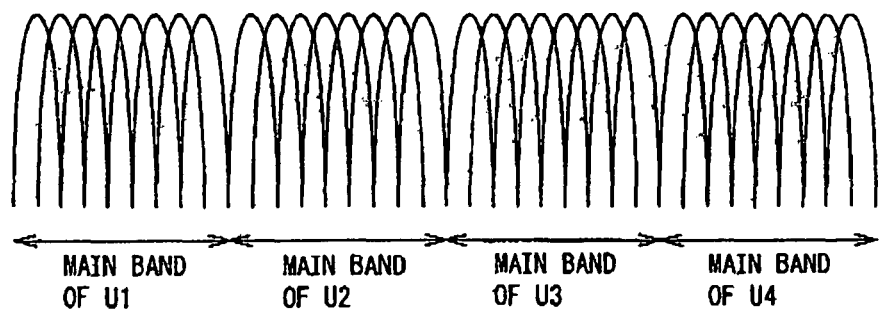
FIG. 11 is a view showing a first example of a mode of allocation of main bands for a plurality of users.
Figure 12:
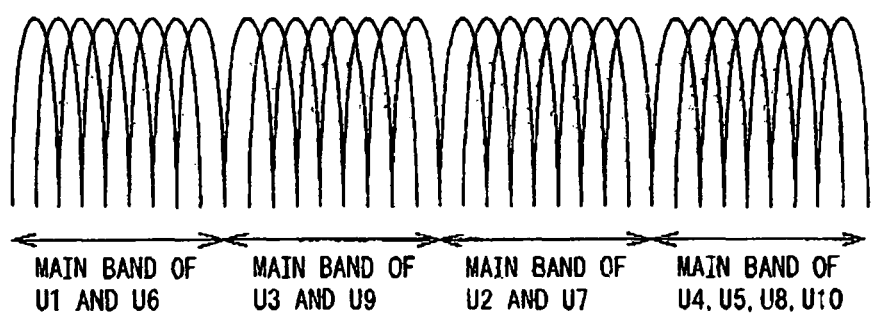
FIG. 12 is a view showing a second example of a mode of allocation of main bands for a plurality of users.

FIG. 11 is a view showing a first example of a mode of assignment of main bands for a plurality of users, and FIG. 12 is a view showing a second example of a mode of assignment of main bands for a plurality of users. Note that these modes can also be applied to extension bands.

Referring to FIG. 11 first, main bands of users U1 to U4 are individually assigned to a plurality of frequency bands, that is, band 1 to band 4. Note that, in this case, the number of users is restricted by the number of bands.

Therefore, as shown in FIG. 12, the same main band is simultaneously assigned with respect to a plurality of communications apparatuses (user terminals). This becomes possible by user multiplexing. As this multiplexing method, there are time division multiplexing and code division multiplexing or multiplexing combining these.

Further, in the present Embodiment 1, also the number of used frequency bands (band 1 to band 4) can be changed in accordance with the predetermined transmission rate of the data information (transmission data Du).

Namely, the base station considers the communication situation, propagation environment, used frequency band, etc. of other terminals in the middle of communications. When judging that another frequency band can be used, it extends the used frequency band. Note that at the time of extension, the available frequency can be extended on a priority basis according to the degree of priority of communications between the terminals, the predetermined transmission rate, and other transmission data attributes (QoS: Quality of Service).

In this way, since the used frequency band information If is transmitted by using a specific frequency band (main band), the reception side need only receive that main band first and does not have to receive and demodulate and decode up to the other frequency bands. Further, by using the extension band, a further speed-up of the transmission rate becomes possible, and an improvement of the frequency utilization efficiency can be achieved.

[Embodiment 2: Dynamic Change of Main Band]

First, describing some characteristic features disclosed in the present Embodiment 2, they are as follows:

i) The frequency band occupied as the main band among the plurality of frequency bands (band 1 to band 4) is made variable along with the elapse of time, ii) whether or not the propagation environment between communications apparatuses (10, 20) is good is judged, then the frequency band of the best propagation environment among the above plurality of frequency bands or the frequency band next to this is selected and set as the main band, iii) at the time of new setting of the main band, the change of the frequency band is notified to the communications apparatus of the other party in advance, iv) the result of detection of the transmission quality (CQI) obtained in response to a pilot channel or pilot signal transmitted between communications apparatuses is used to judge whether or not the above-explained propagation environment is good, v) the judgment of whether or not the propagation environment is good is performed for all of the above plurality of frequency bands sequentially or simultaneously; and vi) further, the result of judgment of the quality of the propagation environment is sent to the communications apparatus of the other party by using the control channel of a specific frequency band.

In general, the transmission characteristic of the control channel must be better in terms of the transmission quality in comparison with the data channel. First, this is because the channel through which the data is to be transmitted must be reliably set. Namely, the main band including the control channel must select the frequency band having a better propagation environment so that the transmission quality thereof becomes good in comparison with the extension band. Therefore, a concrete example of free selection of the frequency band set as the main band in accordance with quality of the propagation environment will be explained.

Figure 13:
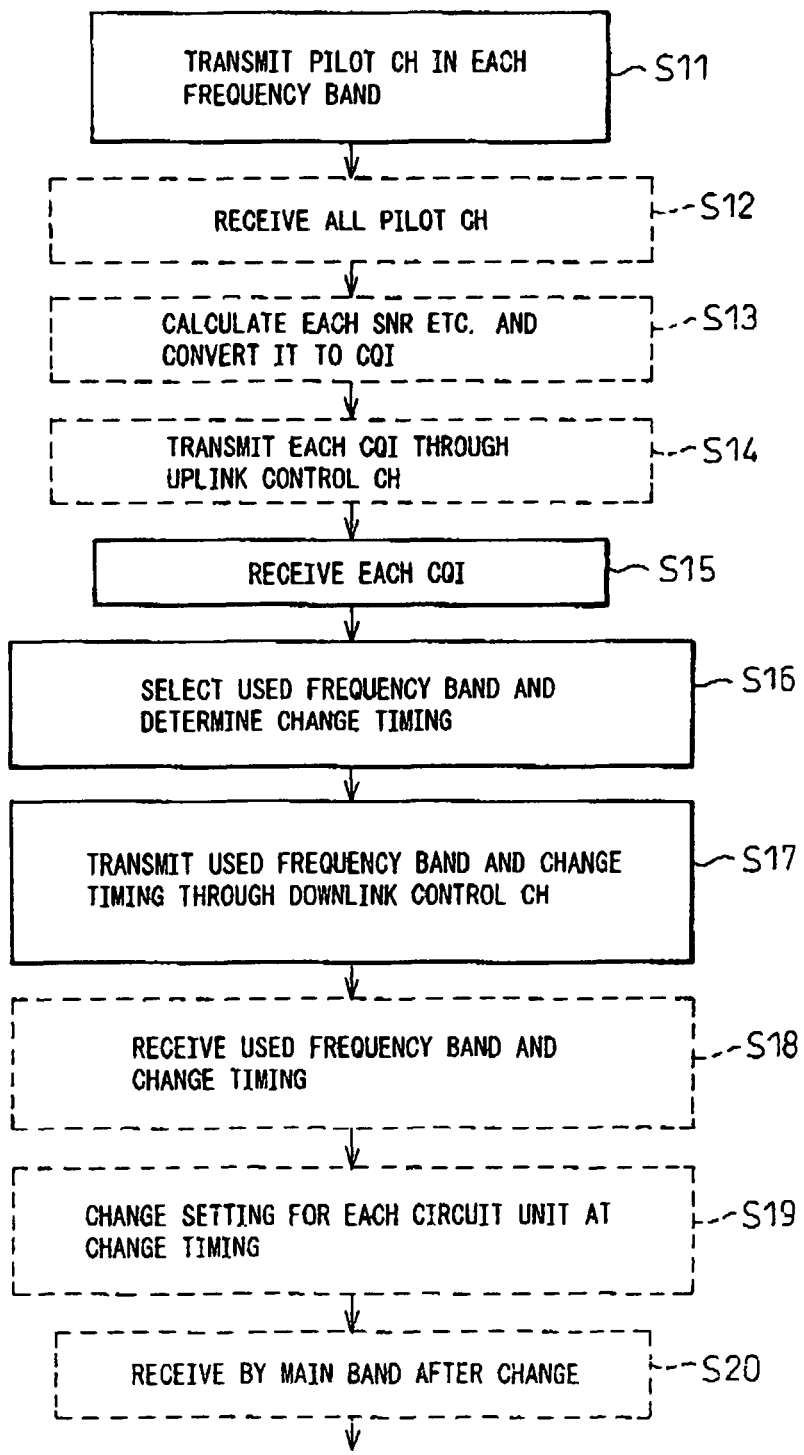
FIG. 13 is a flow chart showing an example of dynamically changing the frequency band of a main band.

FIG. 13 is a flow chart showing an example of dynamically changing the frequency band of a main band. Note that the basic transmission/reception operation between the base station and a terminal is as explained in the above Embodiment 1. Further, in FIG. 13, each solid line block represents an operation of the base station, and each dotted line block represents an operation of the terminal. Note that the reverse may also apply (true for other flow charts explained later as well).

Step S11: Send pilot channel signal at each frequency band.

Step S12: Receive all pilot channel signals,

Step S13: Calculate each SNR etc. and convert it to CQI, and

Step S14: Transmit each CQI by uplink control channel.

Step S15: Receive each CQU,

Step S16: Select used frequency band and determine timing of change of band, and Step S17: Transmit the selected used frequency band and determined change timing by downlink control channel.

Step S18: Receive the above used frequency band and change timing,

Step S19: Change setting for each circuit unit at the above change timing, and

Step S20: Start reception operation by using main band after that change.

Note that the above SNR indicates the signal to noise ratio, and CQI a channel quality indicator. Note that a definition indicating CQI is described in TS25.212 Release 5 etc. of 3GPP (3rd Generation Partnership Project http://www.3gpp.org/). The specifications are recorded at http://www.3gpp.org/ftp/Specs/html-info/25-series.htm.

The processing for making the main band variable along with the elapse of time according to the above flow chart showing one example in FIG. 13 can be accomplished by for example the following hardware configuration.

Figure 15A:
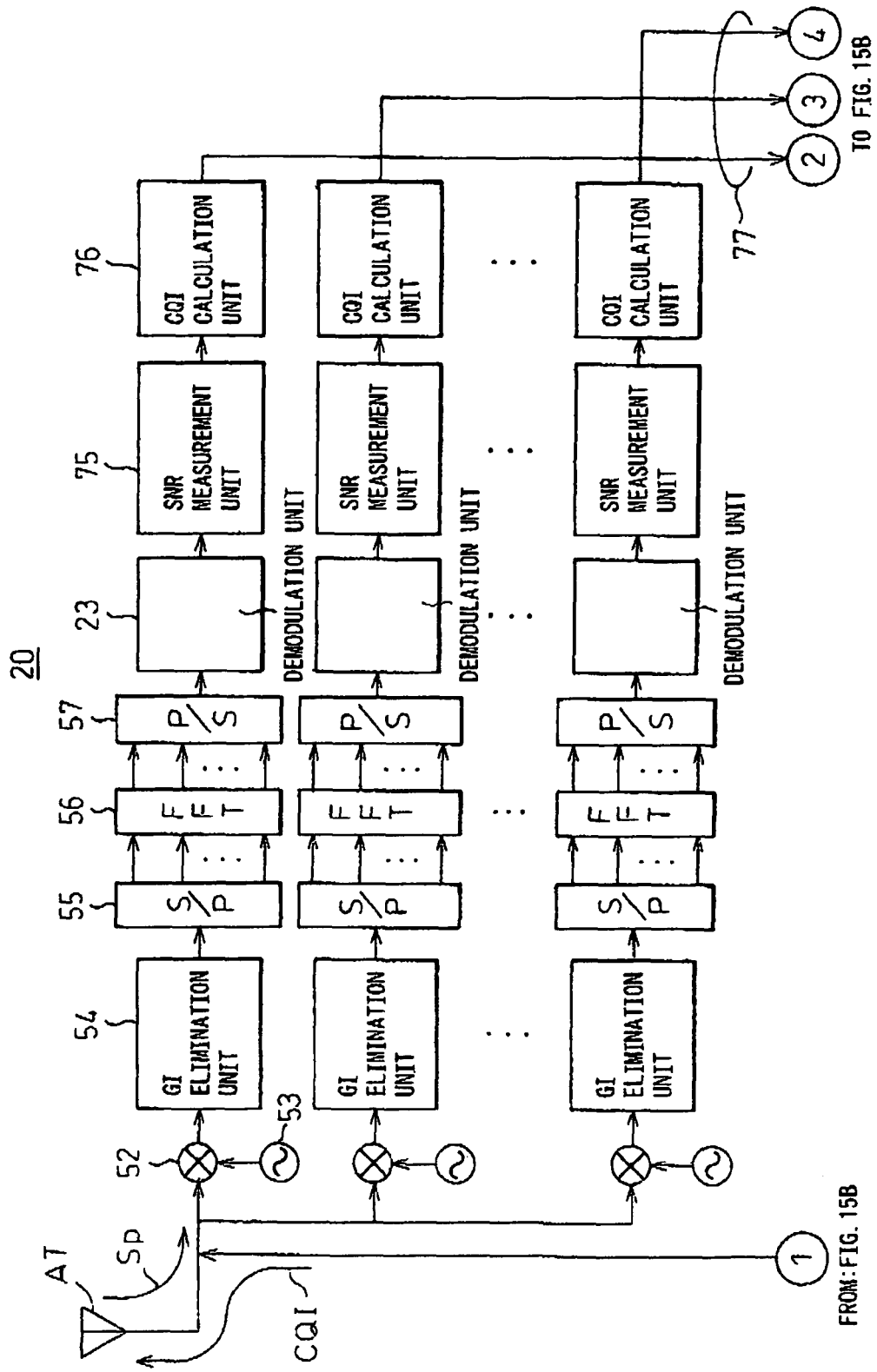

FIGS. 14A and 14B are views showing an example of the hardware configuration of the transmission side of the pilot signal, and FIGS. 15A and 15B are views showing an example of the hardware configuration of the return side of the response (CQI) information to the pilot signal.

The configurations shown in FIGS. 14A and 14B are substantially the same as the configuration of FIG. 3 (or FIG. 5) explained before. The elements to be newly noted are a pilot signal Sp (or pilot channel) on the left end of FIG. 14A, and a multiplexing unit (Mux) 71 for multiplexing the pilot signal Sp and the used frequency band information If and a CQI extraction unit 72 in FIG. 14B. The configuration of this FIG. 14B is substantially the same as the configuration of FIG. 4 (or FIG. 6) explained before. The component to be newly noted is a CQI extraction unit 72 on the lower side of the center of the present figure. Note that, in FIG. 14B, units corresponding to those in FIG. 4 are given the reference numerals 52, 53, 54, used in FIG. 4 plus 100 and thereby indicated as 152, 153, 154, . . . .

Further, the configurations shown in FIG. 15A and 15B are the same as the configuration of FIG. 4 (or FIG. 6) explained before. The components to be newly noted are an SNR measurement unit 75 and a CQI calculation unit 76 in FIG. 15A and further an encoding unit 78 and an adder unit 79 in FIG. 15B after passing through a loop back path 77. Note that in FIG. 15A, parts corresponding to those in FIG. 4 (reception side) are indicated by using the reference numerals 52, 53, 54, . . . used in FIG. 4, while in FIG. 15B, parts corresponding to those in FIG. 3 (transmission side) are given the reference numerals 12, 37, 38, . . . used in FIG. 3 plus 100 and thereby indicated as 112, 137, 138, . . . .

Figure 16:
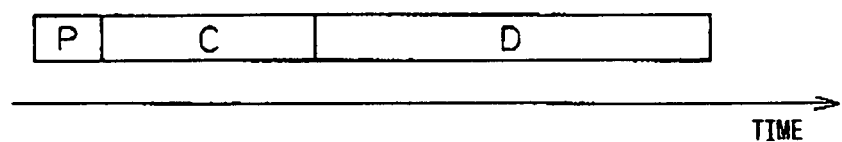
FIG. 16 is a view showing a first example of multiplexing of the pilot signals.
Figure 17:
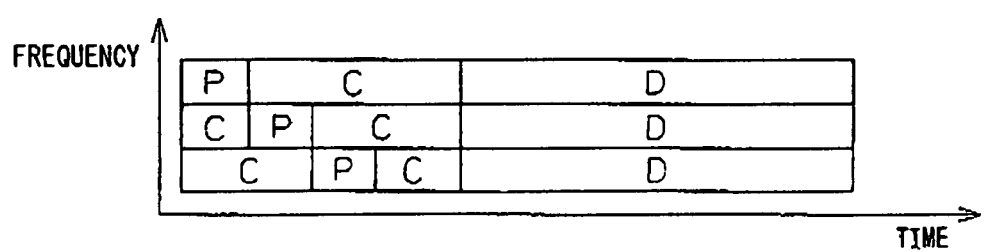
FIG. 17 is a view showing a second example of multiplexing of the pilot signals.

The above pilot signal Sp is transmitted after multiplexing with other transmission information in actual operations. This multiplexing method includes for example the following two schemes:

FIG. 16 is a view showing an example of first multiplexing of a pilot signal, and FIG. 17 is a view showing an example of second multiplexing of a pilot signal. Note that, in both figures, "P" represents the pilot signal Sp, "C" represents the already explained communication control information Ict, and "D" represents the already explained transmission data Du.

FIG. 16 shows that the pilot signal Sp is multiplexed along with the elapsed time, while FIG. 17 shows that the pilot signal Sp is multiplexed along with both the elapsed time and the frequency.

Figure 18:
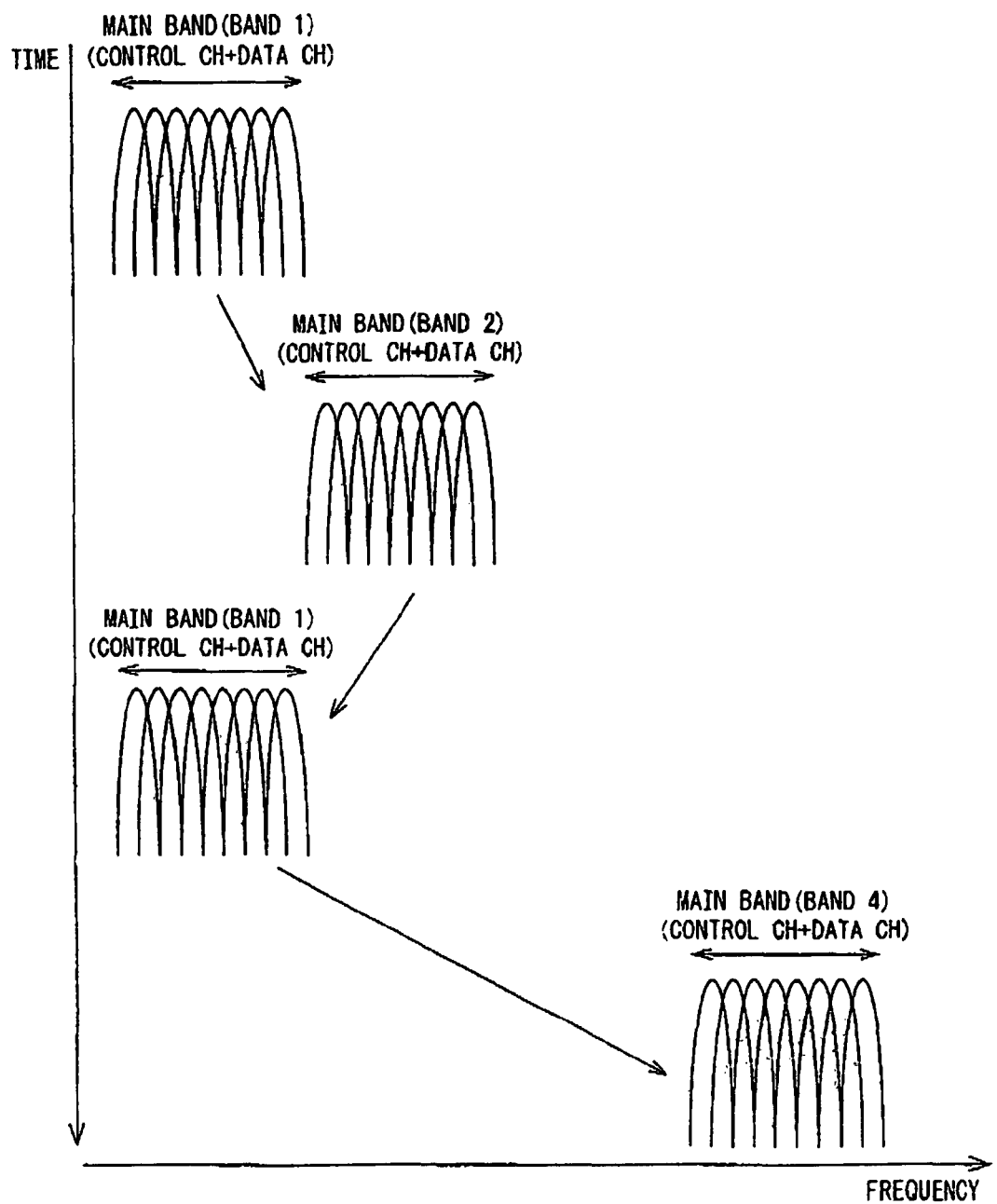
FIG. 18 is a view showing an example of the dynamic change of the main band for easy understanding.

FIG. 18 is a view showing an example of the dynamic change of the main band in the above-explained Embodiment 2 for easier understanding. Time elapses from the top toward the bottom in the present figure. Along with the elapse of time, the main band changes as for example "BAND 1"→"BAND 2"→"BAND 3"→"BAND 4" following the better propagation environment.

Thus, the base station multiplexes the signal for measuring the propagation environment (pilot) in all of the frequency bands used and transmits this as the control channel. Note that, in actual use, a case not including the transmission data Du is also assumed. Further, the pilot channel may be provided in place of the pilot signal Sp.

The terminal receives the pilot channel signals for all frequency bands (band 1 to band 4), measures the reception conditions and propagation environments, for example the SNR and CIR (carrier to interference ratio), calculates the above CQIs from the measurement values, and sequentially or simultaneously transmits the same to the base station for each band by using the uplink control channel. Note that it may also transmit the measurement results of the above CIR and SNR as they are.

The base station receives the uplink control channel signal and demodulates and decodes the CQIs. It selects the frequency band having the best CQI value from among the plurality of CQIs as the main band. It sends this selection result and the timing of change of the main band on the downlink control channel to the terminal.

The terminal receives this downlink control channel signal and demodulates and decodes this to extract the information of the used frequency band and timing of change. Then, at the timing of change, it changes the used frequency band. Note that the timing of change may be determined according to for example an absolute time or relative time or a slot unit. Further, it is also possible not to transmit the timing of change, but set it as after, e.g., 5 slots from the transmission of the downlink control channel signal etc. and thereby fix it for the system.

In the above description, the frequency band having the best propagation environment was selected as the main band, but a case where the best frequency band cannot be selected due to the situation of the other terminal may also be considered. In such case, the second best frequency band next to that may be selected.

Note that here the main band was selected by the base station, but the terminal may similarly select the frequency band having the best propagation environment and transmit this to the base station.

The SNRs, CIRs, etc. may be measured in the terminal simultaneously for all frequency bands as explained above or in a time division manner. Further, in a situation where bands having narrow frequency band widths continue, the propagation environment will not largely vary, therefore, in such case, only one frequency band need be measured. Further, the measurement value thereof may be made a mean value after measurement over a certain time.

Further, in Embodiment 1, the extension band was explained by assuming transmission of only the transmission data Du, but to measure the propagation environment of each frequency band, in addition to the transmission data Du, a pilot channel or pilot signal may also be transmitted.

The above explanation was given with reference to transmission from the base station to a terminal, but the present invention can similarly be conversely applied to transmission from a terminal to the base station.

As already explained, in general, the transmission characteristic of the control channel must be better than the transmission characteristic of the data channel in transmission quality. Accordingly, for the main band including the control channel, it is necessary to select a frequency band having a good propagation environment. According to the above-explained operation, it becomes possible to select a frequency band under the best propagation environment as the main band. Further, even when the propagation environment changes along with the elapse of time, it becomes possible to always select the frequency band under the best propagation environment as the main band.

Due to this, not only the transmission error of the control channel information is reduced, but also the hardware settings of the reception side become easy, and improvement of the transmission quality becomes possible. Further, it is also possible to reduce the number of times of data retransmission due to transmission error, therefore the transmission rate can be further increased.

Further, the main band is variably set, therefore unbalance of the utilization situation (load) among frequency bands can be avoided and improvement of the frequency utilization efficiency can be achieved.

[Embodiment 3: Dynamic Change of Extension Band]

Describing some characteristic features disclosed in the present Embodiment 3 first, they are as follows:

i) The frequency band set as an extension band among a plurality of frequency bands (band 1 to band 4) is made variable along with the elapse of time, ii) whether or not the propagation environment between communications apparatuses (10, 20) is good is judged, and the frequency band next to the frequency band having the best propagation environment among the above plurality of frequency bands is selected and set as the extension band.

iii) Further, the frequency band usable by the communications apparatuses (10, 20) is restricted at the time of establishment of the wireless channel, and the main band and the extension band are dynamically assigned within that restricted frequency band iv) Furthermore, the setting information of the frequency band to be set as the extension band is notified to the communications apparatus of the other party in advance for the extension, v) frequency band setting information concerning the frequency band for which extension is possible or change is possible is received from the communications apparatus of the other party, and the extension band or main band is changed by this, and vi) further, change timing information concerning the timing of the change is received.

vii) Further, the result of judgment as to whether or not the propagation environment is good is transmitted to the communications apparatus of the other party by using a control channel of a specific frequency band, viii) whether or not the propagation environment is good is judged using the result of detection of the transmission quality (CQI) returned in response to pilot channels or pilot signals transmitted between the communications apparatuses (10, 20), ix) based on at least one of the available frequency band of the related communications apparatus, the quality of the propagation environment at each frequency band, the usage situation of each frequency band, and the predetermined transmission rate of the data information (Du), the necessity of the setting or change of the extension band is judged, and x) at the time of new setting of the above extension band, the change of the frequency band is notified to the communications apparatus of the other party in advance.

Figure 19:
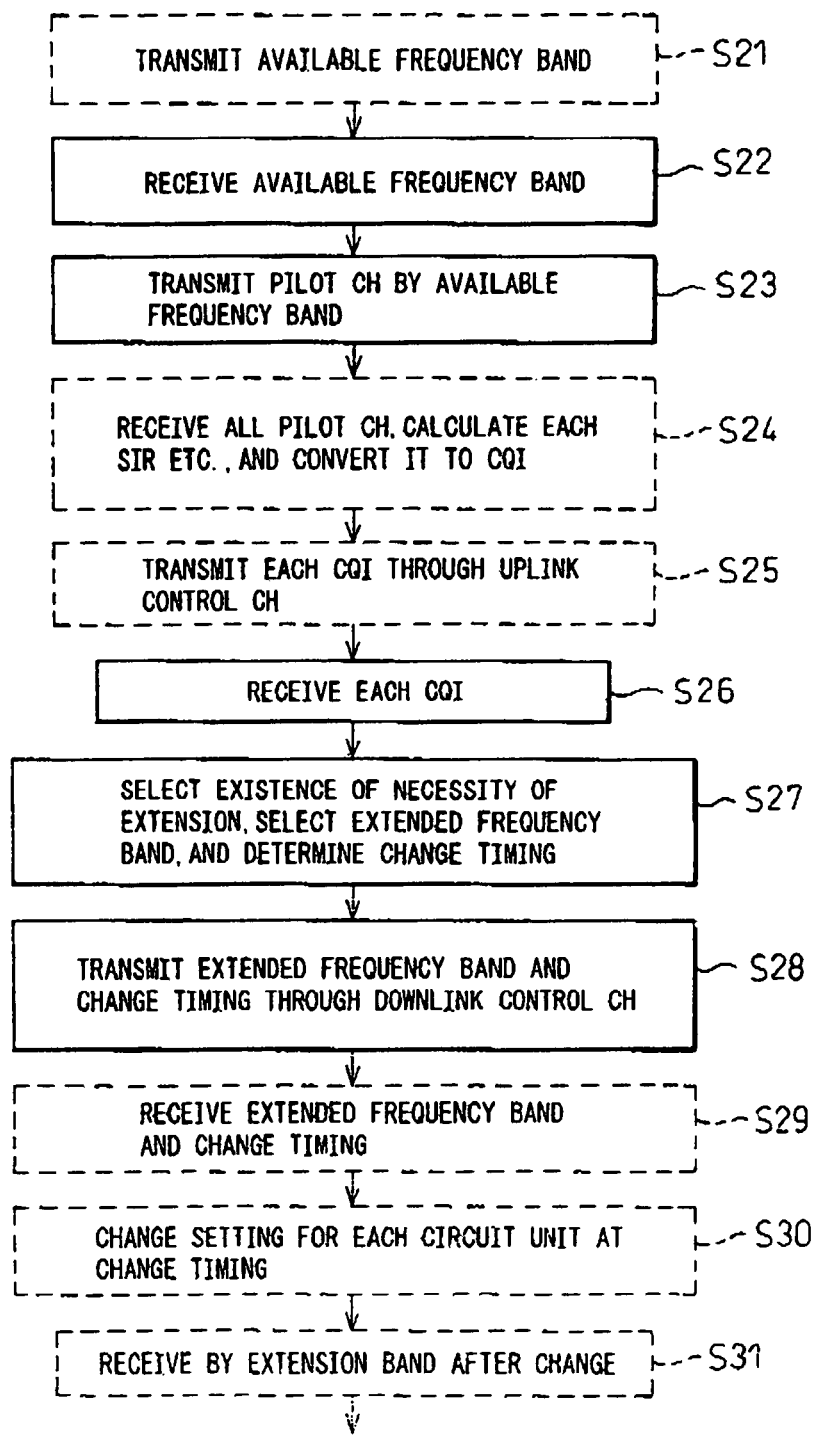
FIG. 19 is a flow chart showing a first example of introduction and allocation of an extension band.
Figure 20:
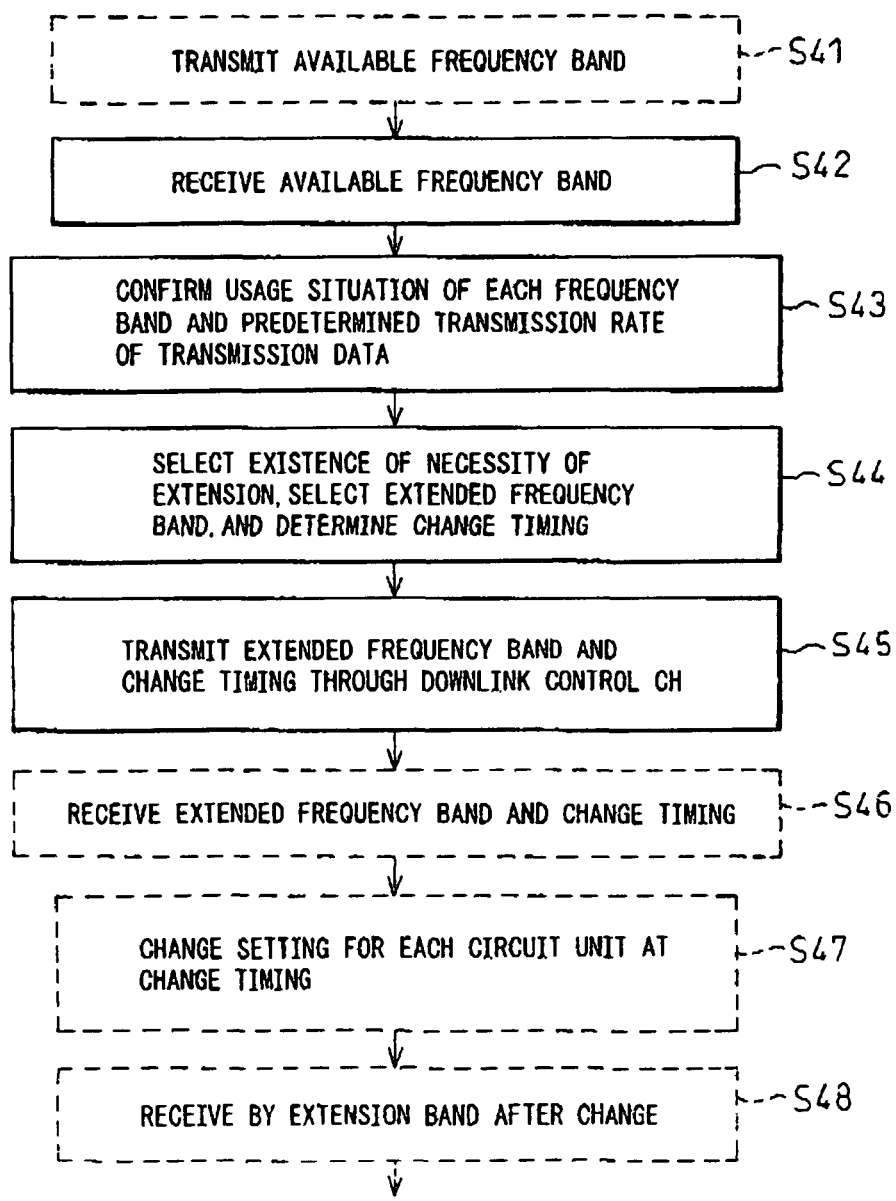
FIG. 20 is a flow chart showing a second example of introduction and allocation of an extension band.
Figure 21:
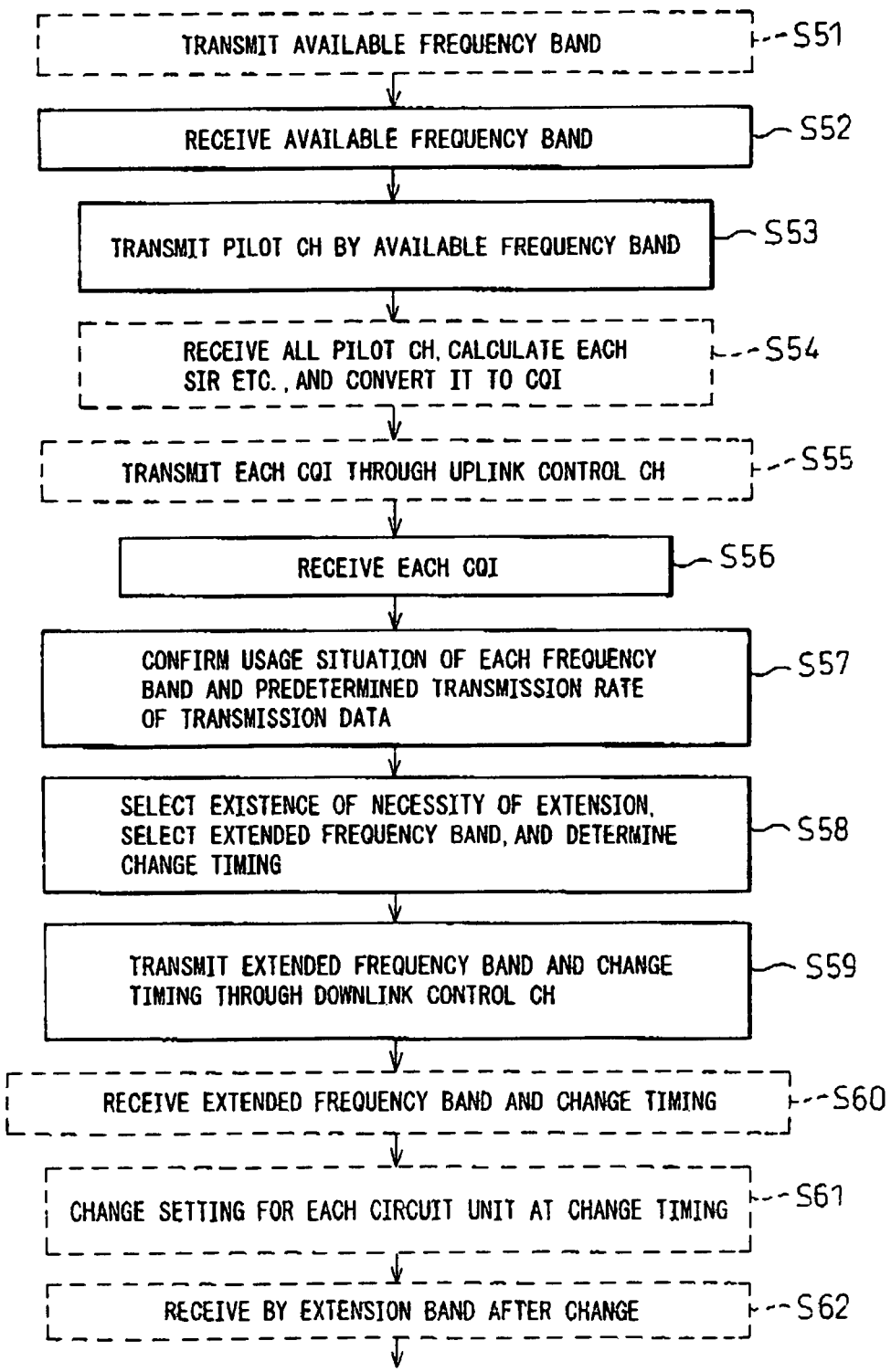
FIG. 21 is a flow chart showing a third example of introduction and allocation of an extension band.

FIG. 19 is a flow chart showing a first example of the introduction and change of an extension band, FIG. 20 is a flow chart showing a second example of the introduction and change of an extension band, and FIG. 21 is a flow chart showing a third example of the introduction and change of an extension band.

Specifically, FIG. 19 shows a control flow in a case of selecting an extension band by using the used frequency band of the terminal and the CQI of each frequency band. Further, FIG. 20 shows a control flow in a case of selecting an extension band by using the used frequency band thereof, the usage situation of each frequency band, and the predetermined transmission rate of the transmission data. Further, FIG. 21 shows a control flow in a case of selecting an extension band by using the used frequency band of the terminal, the CQI of each frequency band, the usage situation of each frequency band, and the predetermined transmission rate of the transmission data.

In FIG. 19,

Step S21: Transmit available frequency band.

Step S22: Receive available frequency band, and

Step S23: transmit pilot channel signals by using available frequency band.

Step S24: Receive all pilot channel signals, calculate SNRs etc., and convert it to CQIs, and Step S25: transmit CQIs through uplink control channel.

Step S26: Receive above CQIs,

Step S27: select existence of need of extension from CQIs, select extended frequency band, and determine timing of change thereof, and Step S28: transmit extended frequency band and timing of change through downlink control channel.

Step S29: Receive above extended frequency band and timing of change,

Step S30: change setting for each circuit part at the timing of change, and

Step S31: start reception operation by using extension band after that change.

Next, in FIG. 20,

Step S41: transmit available frequency band.

Step S42: Receive above available frequency band,

Step S43: confirm usage situations of frequency bands and predetermined transmission rate of transmission data Du, Step S44: select existence of necessity for extension, select extended frequency band, and determine timing of change thereof, and Step S45: transmit extended frequency band and timing of change through downlink control channel.

Step S46: Receive above extended frequency band and timing of change,

Step S47: change setting for each circuit unit at the timing of change, and

Step S48: start reception operation by using extension band after that change.

Further, in FIG. 21,

Step S51: transmit available frequency band.

Step S52: Receive available frequency band, and

Step S53: transmit pilot channel signals by using available frequency band.

Step S54: Receive all pilot channel signals, then calculate SNRs etc., convert to CQIs, and Step S55: transmit above CQIs through uplink control channel.

Step S56: Receive above CQIs,

Step S57: confirm usage situations of frequency bands and predetermined transmission rate of transmission data Du, Step S58: select existence of necessity for extension, select extended frequency band, and determine timing of change thereof, and Step S45: transmit extended frequency band and timing of change through downlink control channel.

Step S60: Receive above extended frequency band and timing of change,

Step S61: change setting for each circuit unit at the timing of change, and

Step S62: start reception operation by using extension band after that change.

In the present Embodiment 3, dynamic change of the extension band is explained. In general, at the time of the setting of a channel (time of establishment of wireless channel), the frequency band available by a terminal is transmitted from the terminal to the base station (or base station controller). This is the above-explained terminal available frequency band. Note that an explanation will be given by assuming a case where this available frequency band is notified, but it may also be considered not to perform such notification in a case where the available frequency band is previously determined in the communications system.

In the same way as the case of the above Embodiment 2, the base station transmits pilot signals Sp, and a terminal transmits the above CQIs calculated based on the received pilot signals Sp to the base station. Next, the base station considers the available frequency band of the terminal, the CQI of each frequency band transmitted from the terminal, the utilization situation of the other terminals, the predetermined transmission rate of the data Du to be transmitted, and so on and judges if the frequency band must be extended (used frequency band must be changed) for that terminal.

When extending is needed, the frequency band is selected. Further, the above timing of change when extending the used frequency band is selected. Then, the selection information of this extension band and the above timing of change are transmitted by using the control channel. The terminal receiving this control channel signal changes the setting of each circuit unit in the terminal based on the information for the extension band and the timing of change, then starts the reception by using that extension band.

This operation will be supplementarily explained next. However, refer to the control flow of FIG. 21 explained before. First, the terminal transmits the frequency band useable by that terminal to the base station or its higher base station controller etc. The base station receiving this transmits pilot channel signals or pilot signals Sp by using that used frequency band. Note that when transmitting pilot channel signals using a common channel common to all terminals, the selection of the used frequency band is not needed.

The terminal receiving the pilot channel signals via the frequency bands calculates the above CQIs based on the above CIRs, SNR, etc., and transmits the CQI calculated values to the base station through the uplink control channel. The base station receiving these considers the CQIs, the utilization situations of the frequency bands, the predetermined transmission rate of the transmission data Du, and other QoS, selects the existence of the necessary for extension and the used frequency band in the case where the extension is carried out, determines the timing of change of the band, and notifies the information to the terminal via the downlink control channel.

The terminal receiving the information sets or re-sets each circuit unit of the terminal at the above timing of change and receives signals by using the extension band after the change at the above timing of change.

Figure 22:
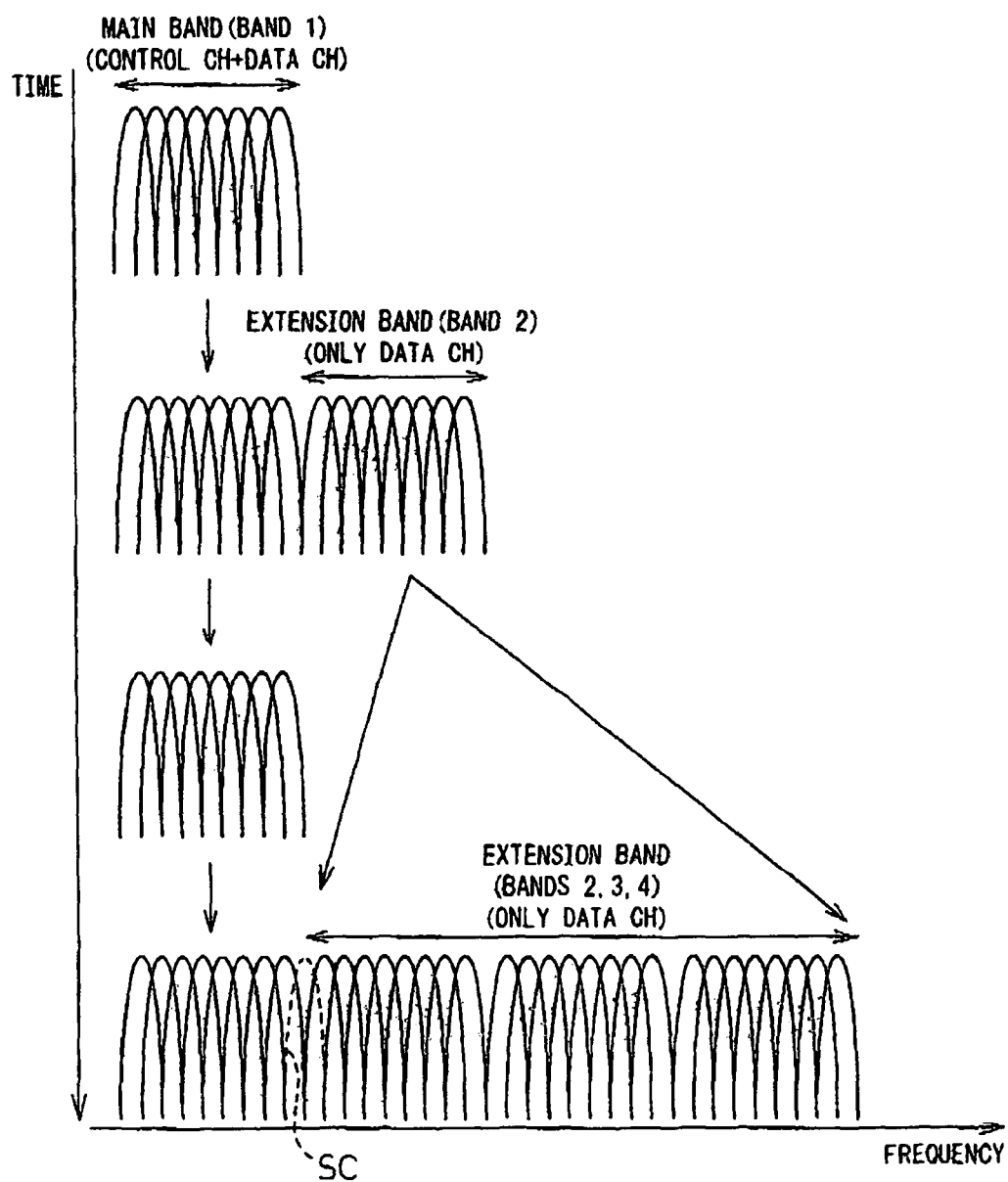
FIG. 22 is a view showing an example of the dynamic change of the extension band for easy understanding.

FIG. 22 is a view showing an example of the dynamic change of the extension band in the present Embodiment 3 for easier understanding. The elapse of time goes from the top toward the bottom in the present figure. As this elapse of time, the extension band is set as "BAND 2"→"band 2+band 3+band 4" exemplified in the figure whenever there is a necessity of extension while selecting a good frequency band next best to the frequency band having the best propagation environment. As in the latter case, the expansion band may be set by combining a plurality of bands.

In this way, the frequency band having a relatively good propagation environment can be selected as the extension band for a propagation environment changing along with the elapse of time. Due to this, the transmission error of the control channel information is reduced, the hardware setting of the reception side becomes easier, and the improvement of the transmission quality becomes possible. Further, the number of times of resending the data can be decreased, therefore the transmission rate can be enhanced. Further, if considering the processing time for correcting the settings on the reception side and notifying the change of the extension band to the other party in advance, the change of setting described above with respect to the apparatus becomes easier.

[Embodiment 4: Dynamic Change of Main Band and Extension Band]

The characteristic features disclosed in the present Embodiment 4 will be shown below.

i) Both of the frequency band to be occupied as the main band among a plurality of frequency bands (band 1 to band 4) and the frequency band to be occupied as an extension band among those plurality of frequency bands can be changed along with the elapse of time without overlap, and ii) further, one main band and at least one extension band are simultaneously changed.

Figure 23:
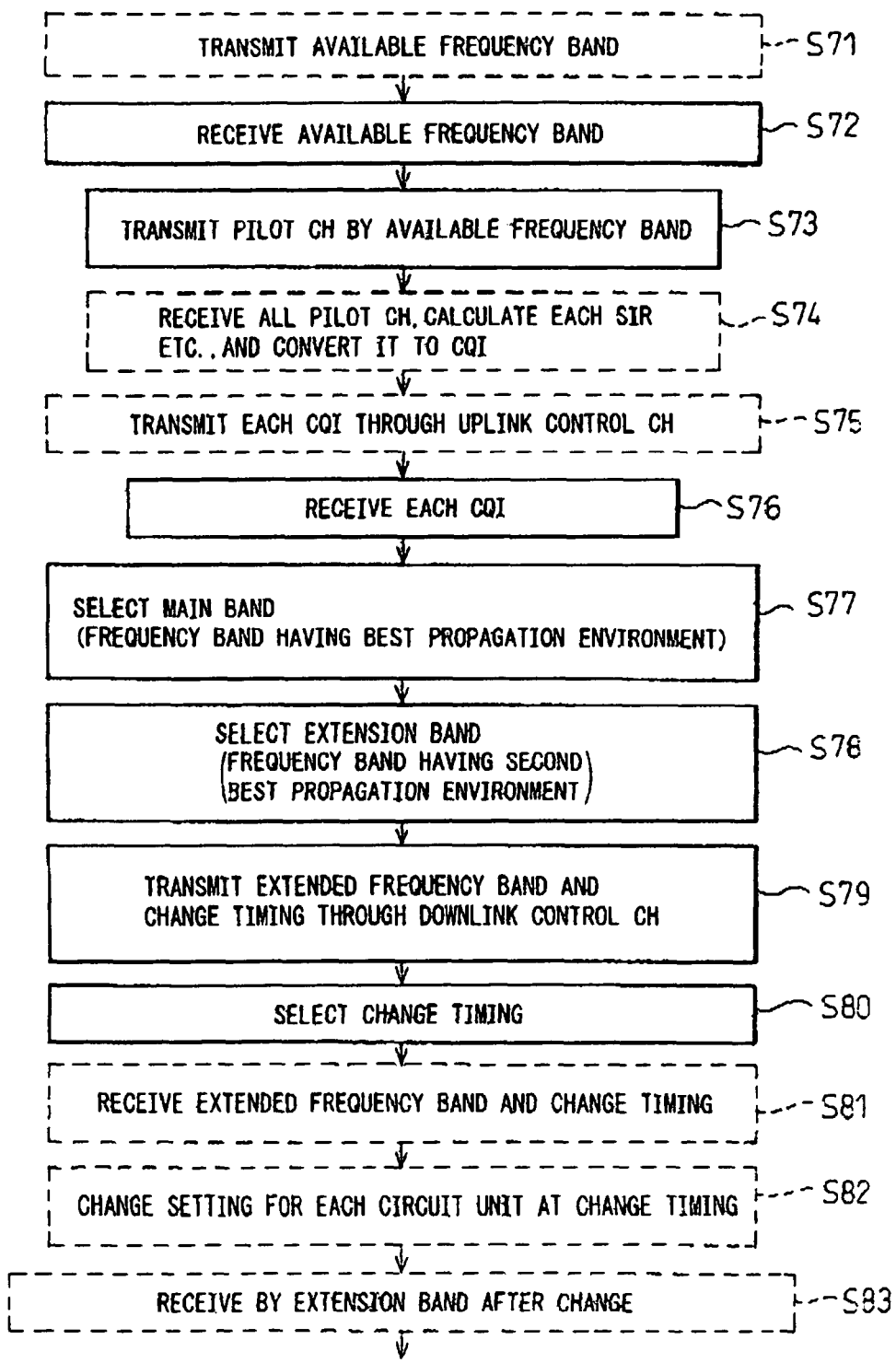
FIG. 23 is a flow chart showing an example of changing both the main band and the extension band.

FIG. 23 is a flow chart showing an example of changing both of the main band and an extension band.

In the present figure,

Step S71: Transmit available frequency band.

Step S72: Receive available frequency band, and

Step S73: transmit pilot channel signals using that available frequency band.

Step S74: Receive all pilot channel signals, calculate SNRs etc., and convert to CQIs, and Step S75: transmit above CQIs through uplink control channel.

Step S76: Receive above CQIs,

Step S77: receive main band, that is, frequency band having best propagation environment, Step S78: further, select extension band, that is, frequency band having second best propagation environment, Step S79: transmit extended frequency band and its timing of change through downlink control channel, and Step S80: select timing of change thereof.

Step S81: Receive above extended frequency band and timing of change,

Step S82: change setting for each circuit unit at the timing of change, and

Step S83: start reception operation in extension band after that change.

Figure 24:
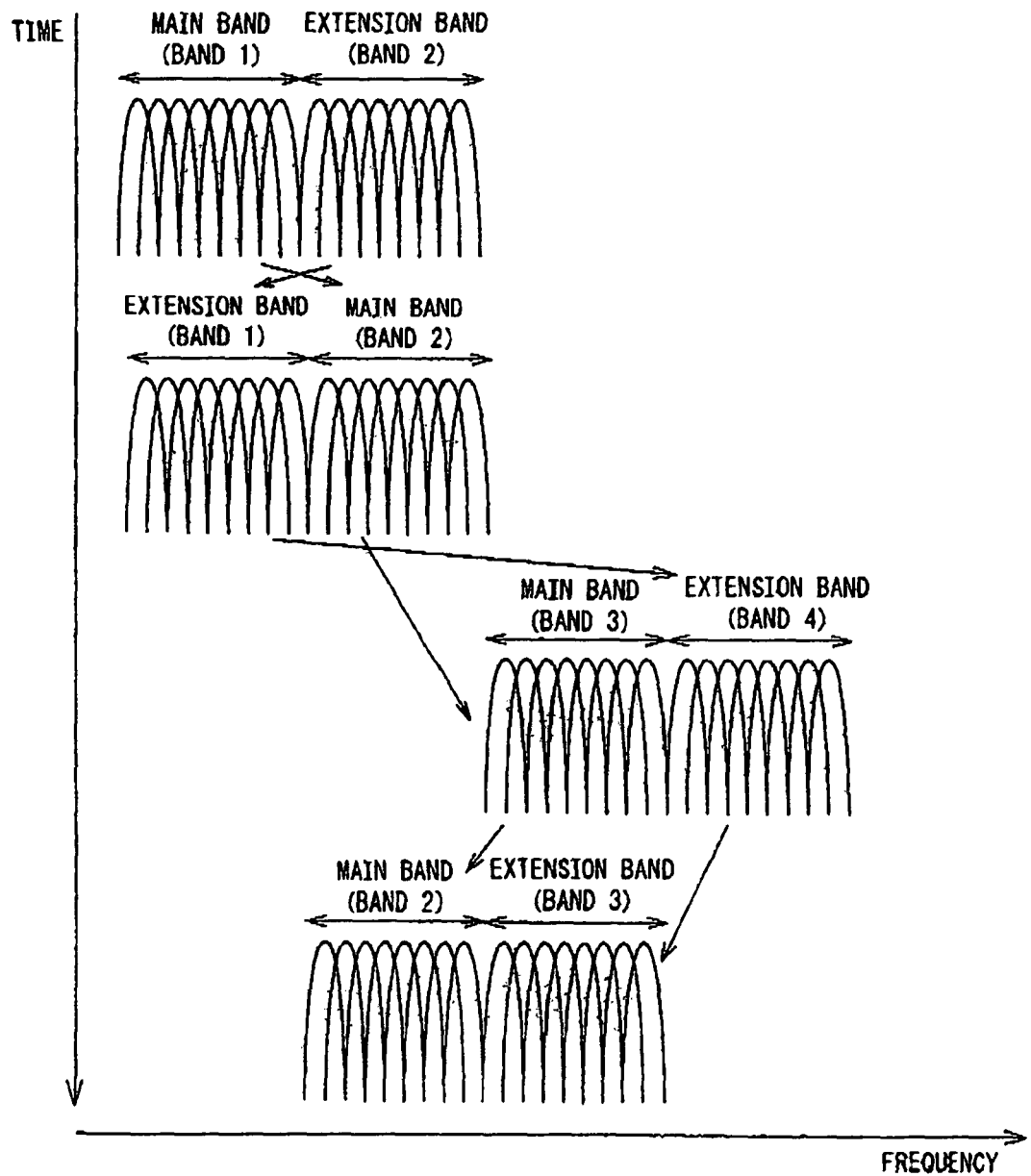
FIG. 24 is a flow chart showing an example of the dynamic change of both the main band and the extension band for easy understanding.

Supplementing the explanation for the control flow of FIG. 23, here, it is assumed that each main band and each extension band are selected based on a predetermined transmission rate of the transmission data Du (see FIG. 24). The frequency band having the best propagation environment is selected as the main band based on the above CQIs of the frequency bands transmitted from the terminal. Then, the frequency band having the propagation improvement which next best to that (second) is selected as the extension band. Then, the timing of change is selected, and these are transmitted to the other party via the control channel.

The terminal receiving the used frequency band information (both of the main band and the extension band) and the change timing information changes the settings of the reception side circuit unit at this timing of change, then receives the two signals of the main band and the extension band.

FIG. 24 is a flow chart showing an example of the dynamic change of the main band and extension band in the present Embodiment 4 for easier understanding. The elapse of time goes from the top toward the bottom in the figure. Along with that the main band is set as "BAND 1"→"BAND 1"→"BAND 3"→"BAND 2" as exemplified in the present figure, the extension band is set while forming a pair at either the left or right of the main band (on left side or right side in the present figure). Note, the two bands do not always have to form a pair. When looking at for example the third stage in the figure, there also exists a case where this extension band (band 4) does not exist, and when looking at for example the fourth stage in the figure, this extension band may not exist in the shown band 3, but may exist in the band 4 on the right adjacent to that with a space.

From the above description, it becomes possible to use the frequency bands with the best and second best propagation environments as the main band and the extension band. Further, even when the propagation environment changes along with time, it becomes possible to select the frequency bands having the best and second best propagation environments as the main band and the extension band.

Due to this, in the same way as the above embodiments, the transmission error of the control channel information is reduced, the hardware settings on the reception side become easier, and improvement of the transmission quality becomes possible. Further, the number of times of resending the data can be decreased, therefore the transmission rate can be improved. Further, by considering the processing time for correcting the settings on the reception side and notifying the change of the main band and the extension band to the other party in advance, the change of the hardware settings becomes easy.

[Embodiment 5: Selection of Main Band and Extension Band According to Propagation Environment]

First, the characteristic features disclosed in the present Embodiment 5 are shown below.

i) Judgment of whether or not the propagation environment between the communications apparatuses (10, 20) is good is performed individually for each of a plurality of frequency bands (band 1 to band 4), the judgment result for each frequency band is individually transmitted to the communications apparatus of the other party, ii) the judgment of whether or not the propagation environment between the communications apparatuses (10, 20) is good is performed individually for each of a plurality of frequency bands (band 1 to band 4), the judgment results for all frequency bands are multiplexed, and the multiplexed results are transmitted to the communications apparatus of the other party all together, and iii) the above judgment results are transmitted to the communications apparatus of the other party by using either the main band, extension band, or frequency band having a relatively good propagation environment.

Figure 25:
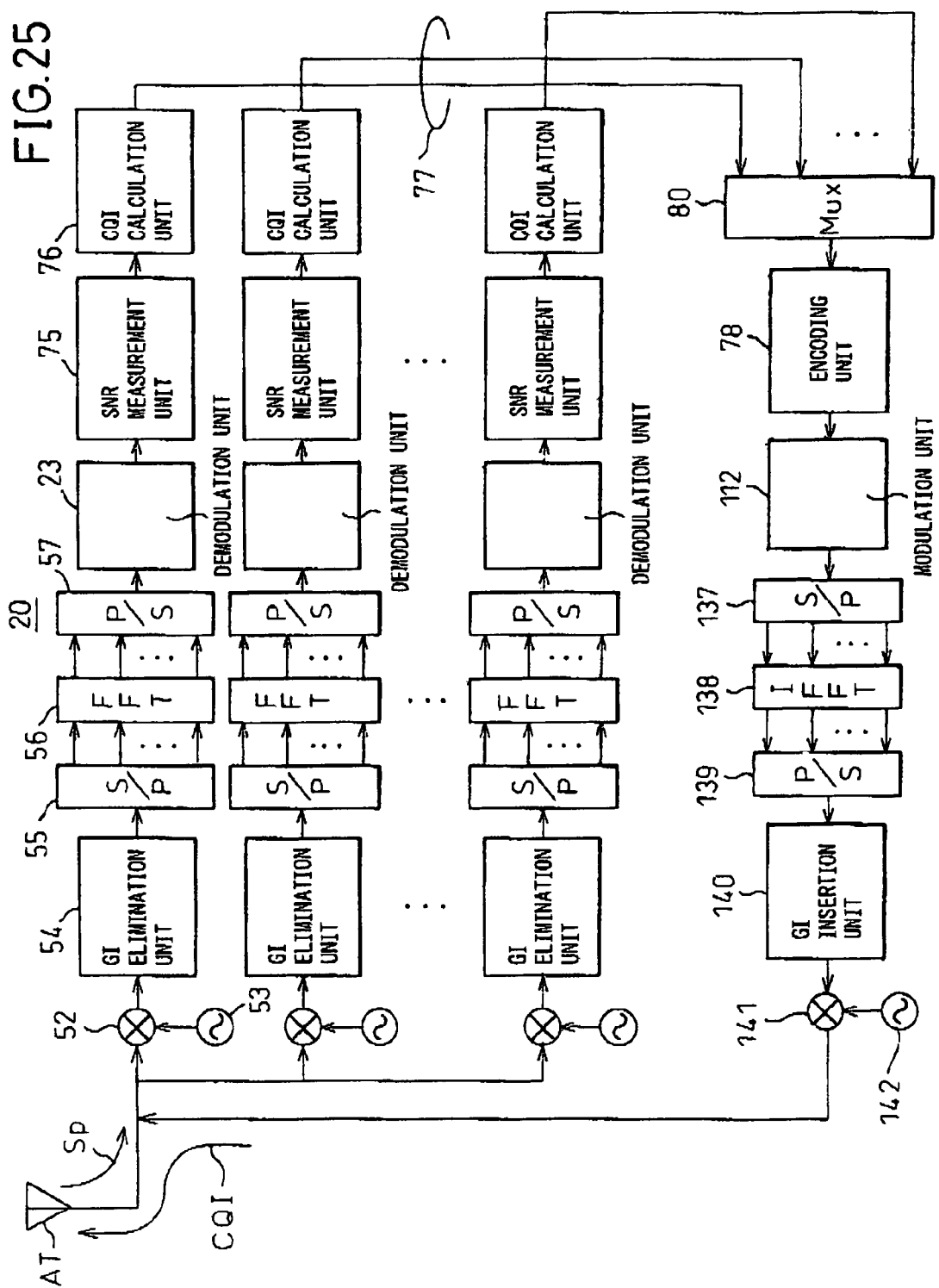
FIG. 25 is a view showing an example of the hardware configuration on the return side of response (CQI) information to a pilot signal.

In carrying out the present Embodiment 5, the already explained example of configuration of FIGS. 15A and 15B can be used or the example of configuration of FIG. 25 can be used.

FIG. 25 is a view showing an example of the hardware configuration on the return side of the response (CQI) information to the pilot signals. The example of configuration of the present figure is similar to the example of configuration of FIGS. 15A and 15B described above. The difference thereof resides in that individual processing linked with each of a plurality of frequency bands is carried out in FIG. 15B, but in the lower half in FIG. 25, CQIs for a plurality of frequency bands are multiplexed and processed all together. That is, in FIG. 25, the transmission quality (CQI) is transmitted to the other party by one control channel. For this purpose, a multiplexing unit (Mux) 80 is introduced into the output side of the loop back path 77.

In the embodiments explained before, when transmitting the CQIs of the different frequency bands from a terminal to the base station, they may be transmitted through the uplink control channel for each frequency band or the CQIs for all frequency bands may be transmitted through the uplink control channel of for example the main band.

When transmitting the CQIs by using the uplink control channel for each frequency band, the example of configuration of FIGS. 15A and 15B is used. Note that, in the present example of configuration, no description is made of the uplink transmission data Du, but it is also possible to multiplex this data Du on the control channel and transmit the same. Further, the present example of configuration assumes a case where pilot channel signals are simultaneously received for a plurality of frequency bands.

In the terminal shown in FIG. 25, the signal of each frequency band is received and converted in frequency corresponding to that frequency band. Thereafter, the GI is eliminated at the GI elimination unit 54, a frequency-time transform is applied by the S/P unit 55, FFT unit 56, and P/S unit 57, then the result is demodulated at the demodulation unit 23. The propagation situation is measured by the SNR, CIR, etc. using this demodulation signal, then the CQI value is calculated.

The above CQI value calculated for each frequency band is transmitted through the control channel of each frequency band. At this time, it is also possible to transmit the other control channel signal together. Further, it is also possible to transmit the same together with the uplink transmission data.

The calculated CQI enters into the part of FIG. 15B by the loop back path 77, is encoded at the encoding unit 78, modulated at a modulation unit 112, then subjected to a time-frequency transform at an S/P unit 137, an IFFT unit 138, and a P/S unit 139. Further, the GI is inserted at a GI insertion unit 140, then the result is converted to the corresponding frequency band and transmitted from the antenna AT.

From the above description, it becomes possible to transmit the CQI (propagation situation) of each frequency band to the base station in the same way as the embodiments explained before. Further, it becomes possible to select the frequency band having a good propagation environment as the main band based on the CQIs (propagation situations) sent from the terminal. In the same way, it becomes possible to select the frequency band having a relatively good propagation environment as the extension band. In this way, in the same way as the embodiments explained before, the transmission characteristics are improved by using the better frequency band, and the number of times of resending the data is decreased, therefore improvement of the transmission rate becomes possible.

Next, the example of configuration of FIG. 25 described above is employed for a case of transmitting all CQIs by using the uplink control channel of a specific frequency band. In the same way as the case of using the uplink control channel for each frequency band explained above, the CQI in each frequency band is calculated. These calculation results are combined into one at the above multiplexing unit (Mux) 80, then this is encoded at the encoding unit 78. Further, it is modulated at the modulation unit 112, then subjected to a time-frequency transform at the S/P unit 137, IFFT unit 138, and P/S unit 139 and given a GI at the GI insertion unit 140. Thereafter, the result is converted in frequency by the circuits 141 and 142 and transmitted from the antenna AT.

Note that, as the frequency band used for the transmission of the CQI to be used, the main band which is selected because of its relatively good transmission environment may be selected, the frequency band having the best propagation environment (best CQI) may be selected, and another frequency band may be selected. Further, the frequency band previously set as the communications system may be used.

From the above description, in the same way as the embodiments explained before, it becomes possible to transmit the CQI (propagation situation) of each frequency band to the base station. Further, it becomes possible to select the frequency band having a good propagation environment as the main band based on the CQI (propagation situation) sent from the terminal. In the same way, it becomes possible to select the frequency band having a good propagation environment as the extension band. By selecting the better frequency band in this way, the transmission characteristics are improved, the number of times of resending the data is decreased, and therefore improvement of the transmission rate becomes possible.

[Embodiment 6: High Efficiency Transmission of Used Frequency Band Information]

The characteristic feature disclosed in the present Embodiment 6 is that, for each of a plurality of frequency bands (band 1 to band 4), at least one of information (i to iv) of (i) a frequency band identification number, (ii) used/not yet used as main band, (iii) used/not yet used as extension band, and (iv) current status maintained is encoded and transmitted to the communications apparatus of the other party.

FIG. 26 is a view showing tables for explaining the high efficiency transmission of the used frequency band information. Table 1 shows an example of correspondence of the used frequency band and band number, and Table 2 and Table 3 show a first example and a second example of the method of setting of used/not yet used of the used frequency band.

In the transmission of the above used frequency band information in the embodiments explained above, for example, by assigning numbers to frequency bands and transmitting the numbers, the amount of control channel information can be reduced in comparison with the case where the value of frequency per se is transmitted. A concrete example will be explained by using the above Table 1 to Table 3. Note that, here, an example where the frequency band useable by the communications system as a whole is set to 800 MHz to 820 MHz and this is divided into four frequency bands as in FIG. 9 for use is shown.

First, band numbers (1, 2, 3, 4) are assigned to the bands as shown in Table 1. Further, which frequency band is to be used as the main band, and which frequency band is to be used (or not used) as the extension band is set as in Table 2.

At this time, in for example a case where the band 1 is "not yet used", the band 2 is used as the "main band", the band 3 is used as the "extension band", and the band 4 is "not yet used", the following control data "yy1100zz" is obtained wherein yy and zz are "01" or "10".

Note that, here, the above control data was prepared in a sequence of band 1, band 2, band 3, and band 4, but this sequence may be any so far as recognition is possible on the transmission side and the reception side. Further, the number of bands can be freely increased or decreased. Further, an explanation was given here by taking as an example four consecutive frequency bands, but nonconsecutive frequency bands having not yet used bands in the middle may also be employed.

As described above, by encoding information (forming tables), the amount of information can be reduced in comparison with for example the case where the value of the center frequency of the band per is transmitted.

Further, as shown in Table 3, it is also possible to provide settings in the case where there is no change in the usage situation, that is, the case of "current status maintained".

By encoding (forming tables) the used frequency band information as described above, the data length of the control signal can be compressed. Accordingly, the ratio of the transmission data and the control channel information is reduced for the latter, and accordingly the transmission efficiency of the transmission data is improved.

[Embodiment 7: Continuous Setting and Nonconsecutive Setting of Extension Bands]

First, when describing the characteristic features disclosed in the present Embodiment 7, they are as follows.

i) One extension band or two or more consecutive extension bands are assigned as the frequency bands consecutive to the main band on the frequency axis, ii) or an isolated extension band not consecutive with any of the extension bands is further included on the above frequency axis, and iii) a signal having no meaning is inserted in the not yet used frequency band accompanying the above isolated extension band and transmitted to the communications apparatus of the other party. Note that as views representing the present Embodiment 7, there are FIG. 27 and the already explained FIG. 22.

Figure 27:
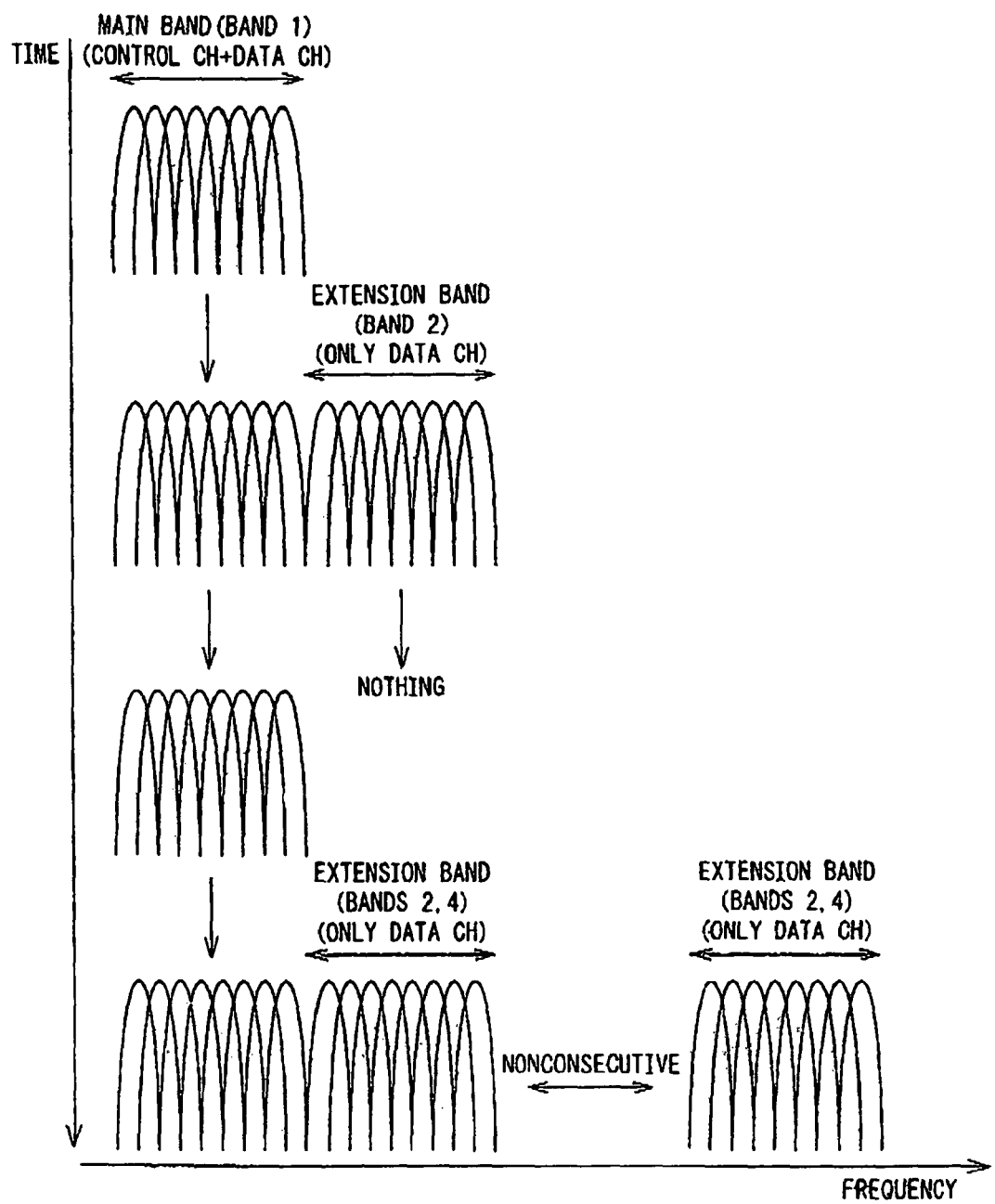
FIG. 27 is a view showing an example of the dynamic change of the extension band.

FIG. 27 is a view showing an example of dynamic change of the extension band. In contrast to the above FIG. 22 showing the case where consecutive extension bands are selected, FIG. 27 shows a case nonconsecutive extension bands (see the fourth stage of the same diagram) are selected. Note that the method of viewing FIG. 27 is exactly the same as the method of viewing the above FIG. 22. This will be concretely explained below.

First explaining the case where the extension bands are consecutive, the already explained FIG. 22 shows a case where the extension bands are consecutively selected. Note as one example, a case where a consecutive band forming a pair with the main band is selected as the extension band. In the mode of this FIG. 22, the extension band is consecutive with the main band, therefore, in comparison with the case of nonconsecutive bands (FIG. 27), the signal processing becomes simpler. Note that the transmission operation and the reception operation are the same as those explained in the above embodiments.

On the other hand, FIG. 27, as described above, also shows a case where an extension band is nonconsecutive (fourth stage). In this way, it is also possible to nonconsecutively select an extension band with respect to the main band or an adjacent extension band from the used frequency band of the terminal, the propagation environment, and the balance with other terminals.

Note that a subcarrier bridging the consecutive frequency bands (see a dotted line SC of FIG. 22) is not set in the explanation hitherto, but according to the usage situation of the other terminals, it is also possible to set a subcarrier bridging two frequency bands and increase the amount of transmission information by that amount.

Further, the reception side terminal does not receive signals at the above nonconsecutive frequency bands or forcibly processes the related signals as meaningless signals. Due to this, even when the extension bands are nonconsecutive, reception can be carried out without problem.

As described above, by setting nonconsecutive extension bands, it becomes possible to flexibly select the extension bands considering the used frequency band of the terminal, the propagation environment, and the usage situation of the other terminals. Further, due to this, the efficiency of frequency utilization is further improved.

[Embodiment 8: Making Number of Subcarriers in Each Frequency Band Constant]

The characteristic feature disclosed in the present Embodiment 8 resides in that the bandwidth of each of a plurality of frequency bands (band 1 to band 4) is set to a predetermined constant value and the number of the series of subcarriers in each band is made a predetermined constant value.

Figure 28:
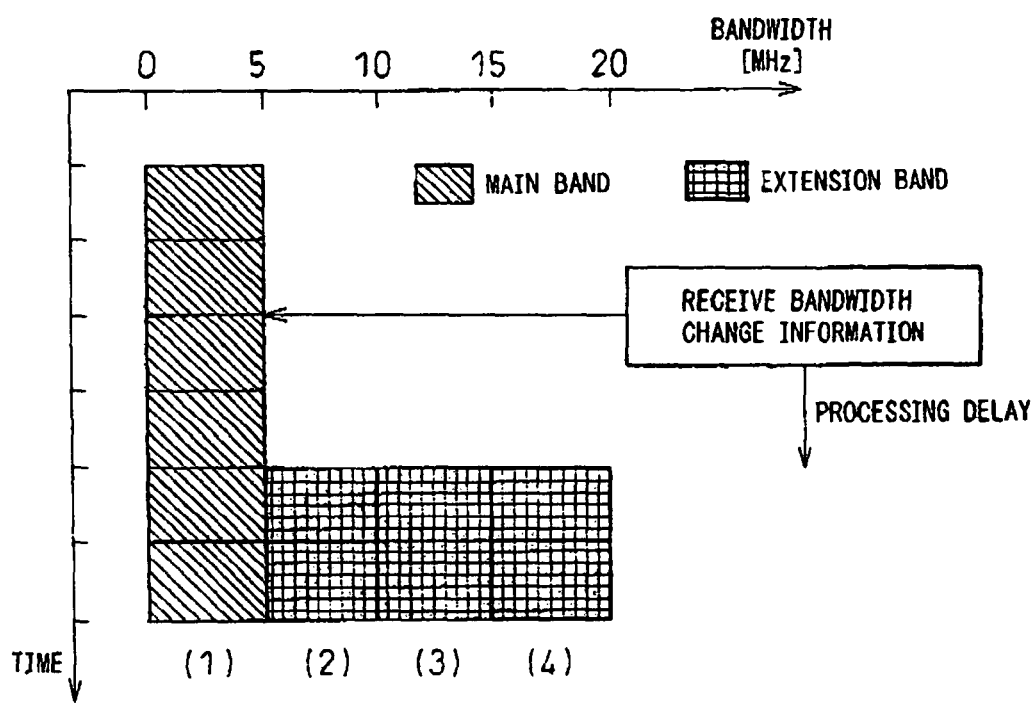
FIG. 28 is a view showing a first example of a band extension pattern.
Figure 29:
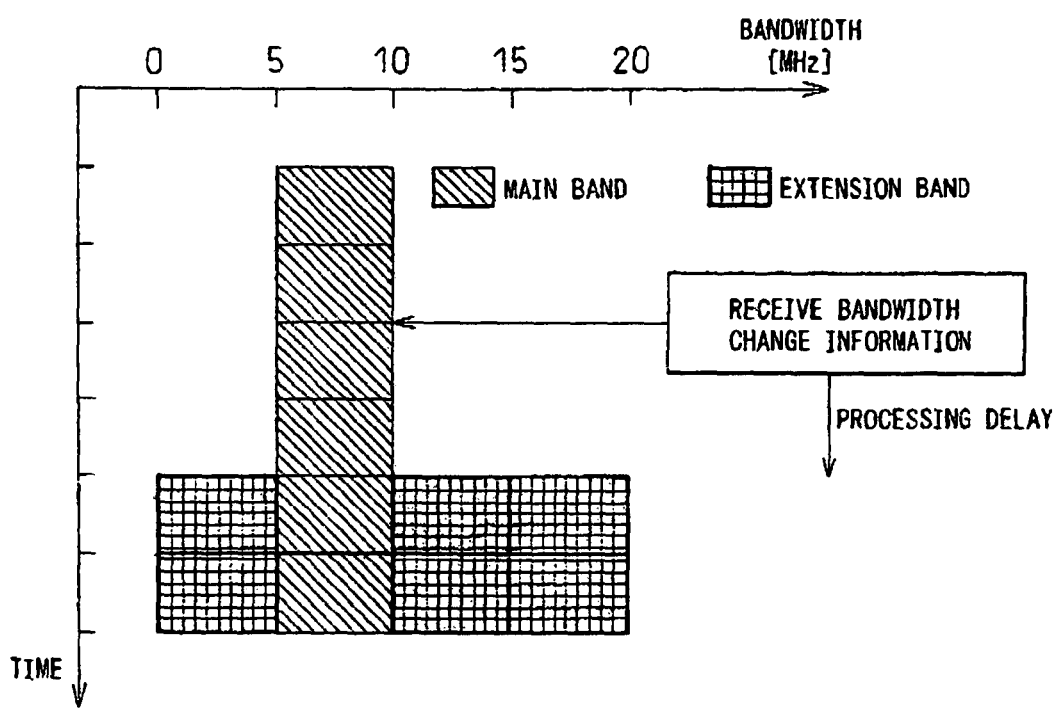
FIG. 29 is a view showing a second example of a band extension pattern.
Figure 30:
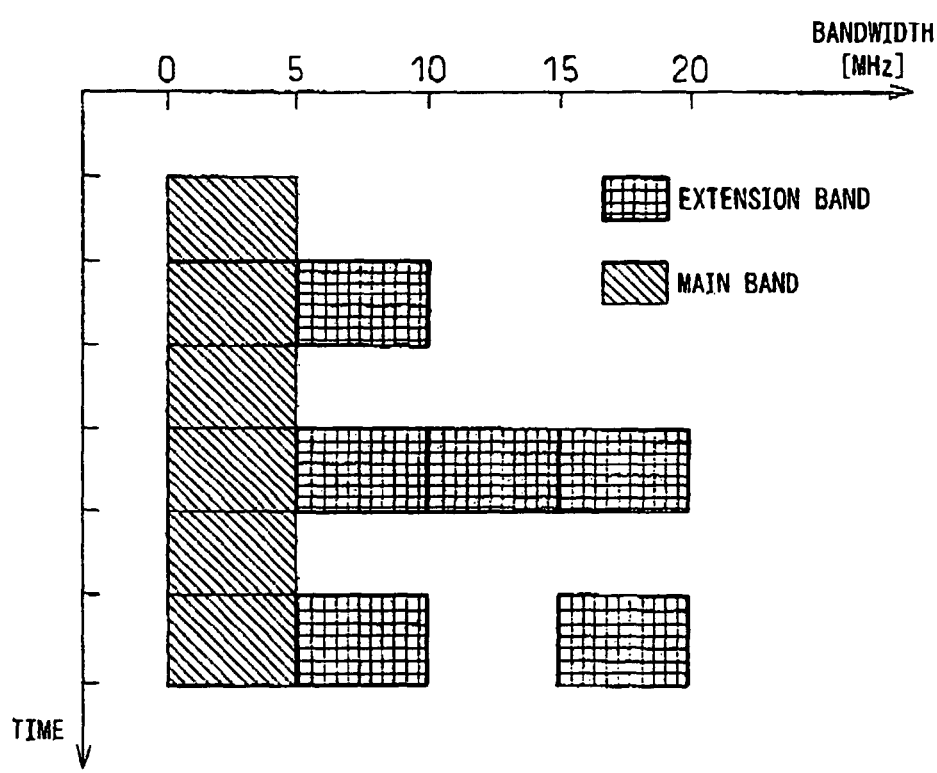
FIG. 30 is a view showing a third example of a band extension pattern.

FIG. 28 is a view showing a first example of a band extension pattern, FIG. 29 is a view showing a second example of a band extension pattern, and FIG. 30 is a view showing a third example of a band extension pattern.

Note that the method of viewing these FIG. 28 to FIG. 30 is substantially the same as the method of viewing the above FIG. 22, FIG. 24, FIG. 27, etc. While FIG. 22, FIG. 24, FIG. 27, etc. show patterns using actual waveforms, FIG. 28 to FIG. 30 only show patterns as blocks of subcarriers in place of such actual waveforms. This is for facilitating the explanation of the present Embodiment 8. Namely, they show the concept of a "frequency band unit" visually for easier understanding. Note that terms described in FIG. 28 to FIG. 30 are already explained except a "processing delay". This processing delay, when viewing for example FIG. 4, means a time delay required for the processing from when the used frequency band information If is input to the used frequency band setting unit 25 to when the band set instruction signal Sb is generated and further the parameters finish being set in each circuit part.

In general, in the multicarrier transmission mode (OFDM, MC-CDMA etc.) or other communication system using a series of subcarriers, when changing the bandwidth, ordinarily the change is carried out in units of subcarriers. In this case, used/not yet used must be set in unit of subcarriers. Further, in the sending processing and receiving processing, signal processing considering "used/not yet used" in unit of subcarriers is necessary, so the setting of bands is liable to become troublesome and complex. Further, in a case where the users are multiplexed, control of used/not yet used of each subcarrier is necessary between users. As a result, a drop in the efficiency of frequency utilization is caused.

Therefore, in the present Embodiment 8, the used frequency band of the communications system as a whole is divided into a plurality of bands (band 1 to band 4), the "number of subcarriers is made constant" in the divided frequency bands, and transmission between communications apparatuses is carried out by using one or more of the frequency bands. Due to this, an improvement of the efficiency of frequency utilization can be achieved.

Specifically, for example one frequency band is set to 5 MHz, and the number of subcarriers in that frequency band is set to 25. By setting a plurality of such frequency bands, the above used frequency band is made variable in units of frequency bands. The above FIG. 28 to FIG. 30 show concrete examples of band extension in units of bands. An abscissa in each diagram indicates the bandwidth, one hatched block represents one frequency band, and a plurality of subcarriers are assumed to be contained in that one frequency band. In the same way as FIG. 9, it may be considered that the band 1, band 2, band 3, and band 4 are arranged from the left.

FIG. 28 shows a case where the band 1 is used as the main band, and FIG. 29 shows a case where the band 2 is used as the main band. Further, FIG. 30 shows an example of changing the setting of the extension band along with the elapse of time and shows a case where those extension bands include a nonconsecutive one (see the sixth stage). Note that the concrete operation of transmission/reception is as explained in the above embodiments.

From the above description, the used frequency band can be easily made variable, and it becomes possible to raise the utilization efficiency of the frequency. Further, when compared with the case where the used frequency band is made variable in units of subcarriers, the above transmission/reception operation becomes further simpler, and the configuration of a transmitter/receiver becomes simpler.

[Embodiment 9: Making Both Number of Subcarriers and Subcarrier Bandwidth in Each Frequency Band Constant]

Describing characteristic features disclosed in the present Embodiment 9, they are as follows:

i) The bandwidth of each of the plurality of frequency bands (band 1 to band 4) is made a predetermined constant value, and the bandwidth of each subcarrier in each band is made a predetermined constant value, and ii) further, also the number of subcarriers is made a predetermined constant value. Due to this, the main band and the extension band can be easily set in units of frequency bands.

In the above Embodiment 8, the number of subcarriers per band was made constant, but in the present Embodiment 9, the bandwidth of each subcarrier is also made constant.

As a result of this, the difference between bands becomes only the center frequency of each. Due to this, baseband signal processing is made uniform irrespective of the frequency band, and, when compared with Embodiment 8, the configuration of the transmitter/receiver becomes further simpler.

[Embodiment 10: Setting of Band Based on Difference Between Predetermined Transmission Rate and Real Transmission Rate]

Describing the characteristic features disclosed in the present Embodiment 10, they are as follows:

i) In order to judge necessity/unnecessity of an extension band, the difference between a predetermined transmission rate 51 assumed to be necessary for the exchange of information and an actual transmission rate S2 which is actually achieved (S1-S2) is calculated. It is judged whether the extension band is required or not required in accordance with the positive or negative sign of this difference, and ii) here, the above actual transmission rate is found from the number of the transmission data information calculated from the number of used frequency bands and the transmission interval of the transmission data information.

Figure 31:
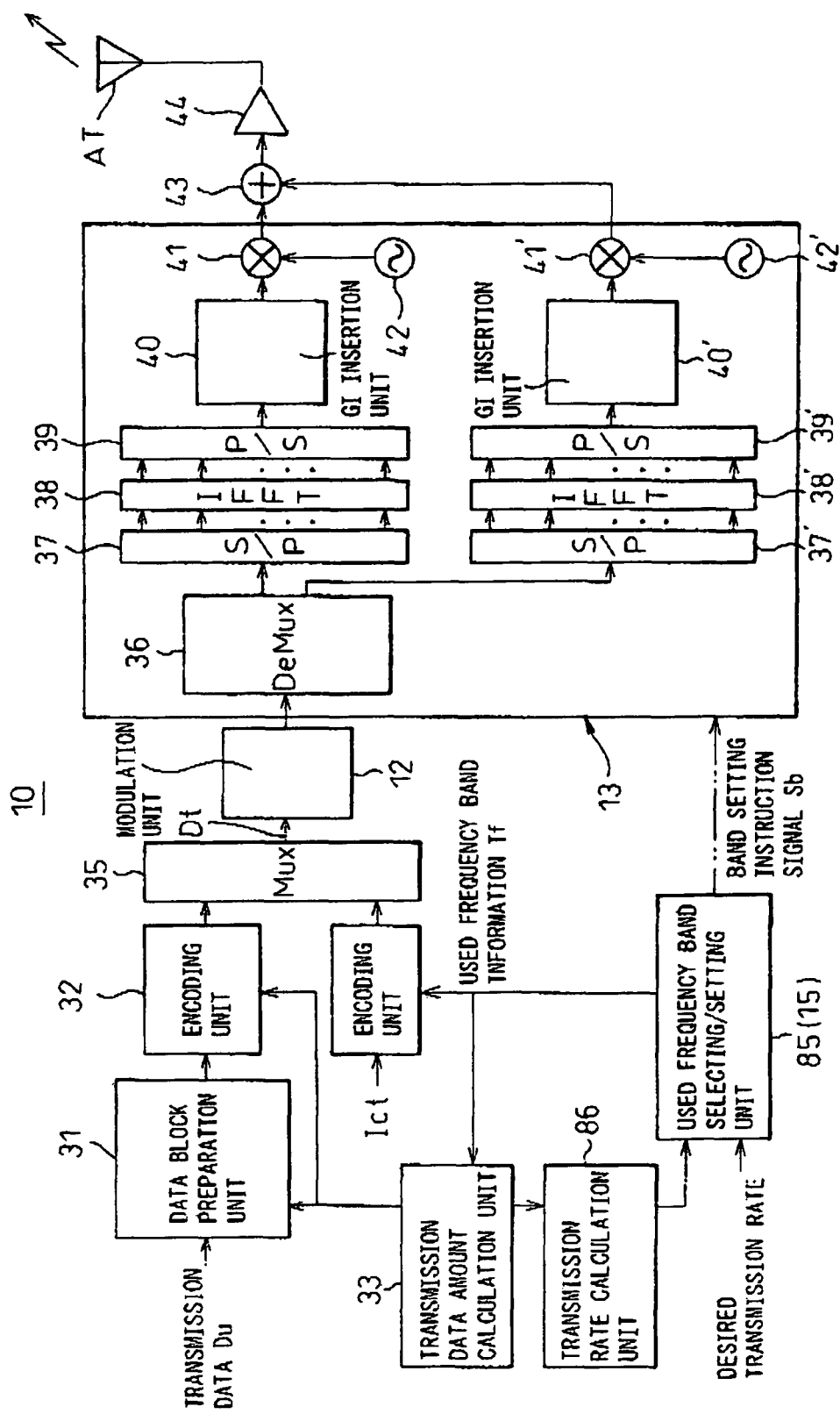
FIG. 31 is a view showing an example of the hardware configuration of a communications apparatus (transmission side) according to Embodiment 10.
Figure 32:
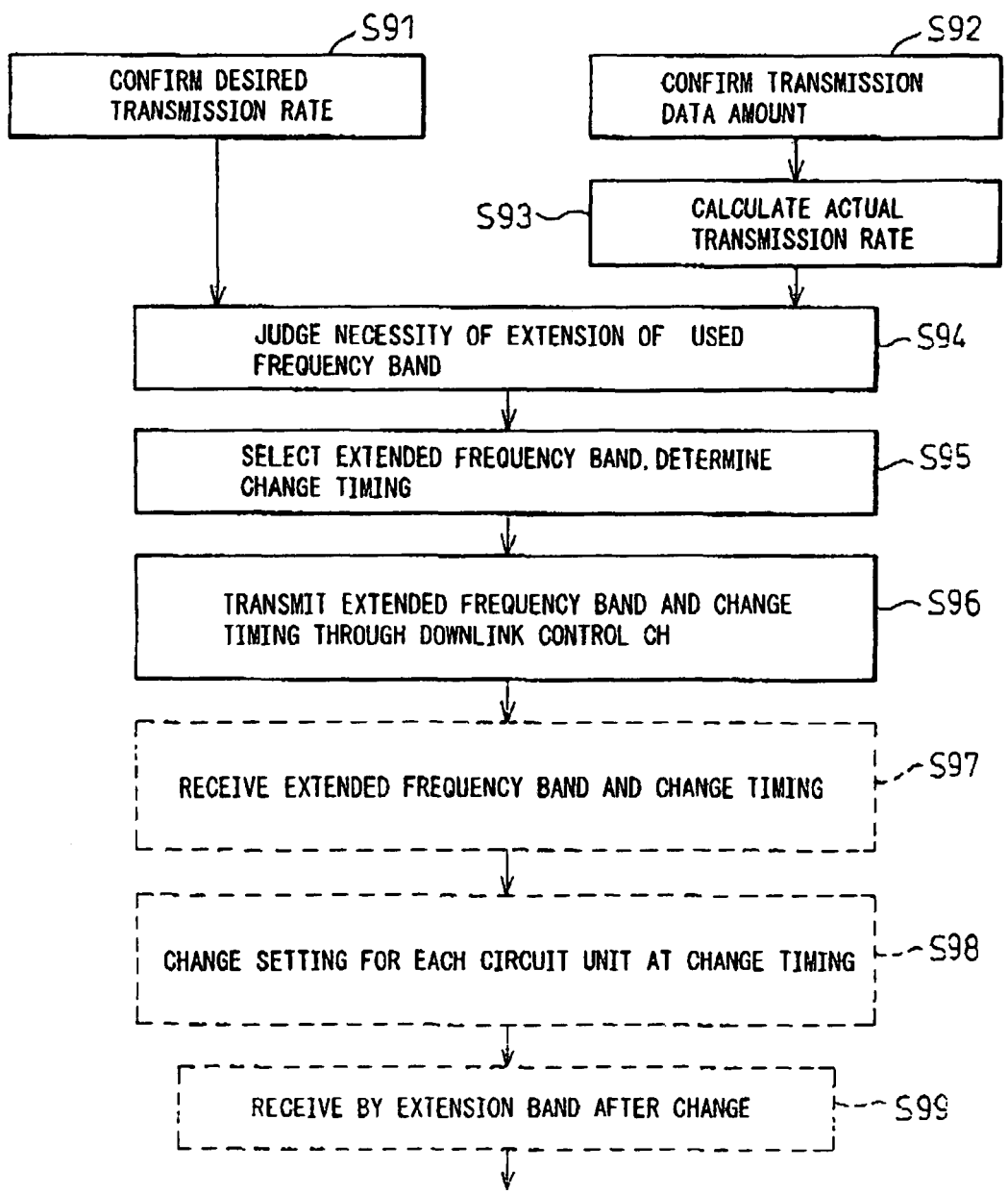
FIG. 32 is a flow chart showing an example of the operation in the apparatus of FIG. 31.

FIG. 31 is a view showing an example of the configuration of the communications apparatus (transmission side) according to Embodiment 10, and FIG. 32 is a flow chart showing an example of the operation in the apparatus of FIG. 31.

Referring to FIG. 31 first, the figure is substantially the same as the configuration of the above FIG. 5 (also FIG. 3 is the same), but differs in the point that a frequency band selecting/setting unit 85 (modification of 15) and an actual transmission rate calculation unit 86 shown on the left end in the figure are introduced.

Further, referring to FIG. 32, the operation thereof is:

Step S91: Confirm predetermined transmission rate,

Step S92: confirm amount of transmission data, and

Step S93: calculate actual transmission rate.

Step S94: Judge whether or not it is necessary to extend used frequency band based on rate values in steps S91 and S93 and judge that it is necessary.

Step S95: Select extended frequency band and determine timing of change, and Step S96: transmit that extended frequency band and its timing of change through downlink control channel.

Step S97: Receive extended frequency band and timing of change,

Step S98: change setting of each circuit unit at that timing of change, and

Step S99: start reception by using extension band after change.

Explaining this further concretely, in the above Embodiment 1, used/not yet used of the extension band and the number of extension bands were determined based on only the predetermined transmission rate, but in the present Embodiment 8, the extension or reduction of the band is carried out by considering the difference between the actual transmission rate and the predetermined transmission rate.

A concrete example will be explained by using FIG. 31 and FIG. 32 again. Note that the explanation will be omitted for the same parts as those in Embodiment 1.

Assume that a predetermined transmission rate Rd of a certain transmission data Du is 10 Mbps, and the transmission is carried out by using the main band and the extension band. At this time, from the number of transmission data calculated from the number of used frequency bands and the transmission interval thereof, an actual transmission rate Ra can be calculated by an actual transmission rate calculation unit 86 of FIG. 31. This actual transmission rate Ra and the predetermined transmission rate Rd are compared at the above selecting/setting unit 85. When the actual transmission rate Ra is lower, the used frequency band is increased (extended). Further, for example, when is judged that the predetermined transmission rate Rd can be secured even when the actual transmission rate Ra is much higher than the predetermined transmission rate Rd and the used frequency band is decreased, the used frequency band is decreased (reduced).

From the above description, an improvement of the efficiency of frequency utilization can be achieved while satisfying the predetermined transmission rate. Note that, other than the above method, it is also possible to ask the base station to return whether or not the data transmitted from the base station could be transmitted to the terminal (ACK/NACK), calculate the actual transmission rate based on that, and make the used frequency band variable. Further, it is also possible to calculate the transmission rate based on the amount of data transmitted from the base station to the terminal, ask the terminal to return this transmission rate value to the base station, and make the used frequency band variable based on that value.

[Embodiment 11: Enlargement of Used Frequency Band]

Figure 33:
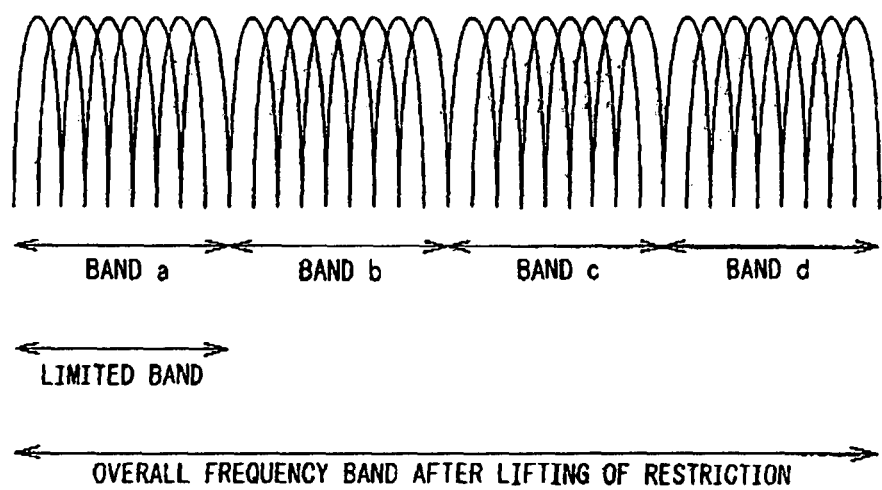
FIG. 33 is a view for explaining Embodiment 11.

FIG. 33 is a view for explaining the present Embodiment 11. The parts to be particularly noted are a "restricted band" and a "overall frequency band after lifting restriction". Here, the characteristic features disclosed in the present Embodiment 11 are as described below:

i) In a communications system for exchange of information between communications apparatuses (10, 20) by the multi-carrier transmission mode using a series of subcarriers, in a case where the usage of only a part of the divided frequency bands ("band a") is permitted at present among a plurality of divided frequency bands (band a to band d) formed by dividing the overall frequency band to be assigned to this communications system in the future (see "overall frequency band after lifting restriction" of FIG. 33) (see "restricted band"), that divided frequency band "band a" allowed to be used is operated further divided into one or more frequency bands (like band 1 to band 4 in Embodiments 1 to 10). At the same time, each of the other divided frequency bands which are restricted at present (band b, band c, and band d) is divided into one or more frequency bands in the same way as the former (like band 1 to band 4 in Embodiments 1 to 10) in advance. Then, when the restriction is lifted in the future, each of the plurality of divided frequency bands (band b to band d) which are formed by dividing the overall frequency band but not yet used at present is immediately operated by the same operation as the operation of dividing the divided frequency band (band a) allowed to be used at present into one or more frequency bands, and ii) here, the plurality of frequency bands (band a to band d) formed by dividing the overall frequency band have constant bandwidths with respect to each other, and the number and bandwidth of subcarriers in each of those divided frequency bands have constant values with respect to each other.

Explaining this further concretely, there may be cases where frequency band usable by the present communications system (or base station) is restricted from the balance with other communications system but later the restriction is lifted for a reason that the frequency used by the other communications system is shifted elsewhere and so on.

When assuming such case, the above limited used frequency band ("limited band a") is operated by dividing the band (a) into one or more frequency bands in the same way as the above embodiments. Then, at this time, the restricted frequency bands (band b, band c, and band d) are individually divided to one or more frequency bands as well. Note that preferably the used frequency band (band a) and restricted frequency bands (bands b to d) are divided with the same bandwidth. FIG. 33 assumes division with the same bandwidth in this way. Further, in FIG. 33, the used frequency band is limited to the "band a" which is operated as a single frequency band. The whole restricted frequency band is divided into three bands (band b to band d), but these bands b to d can not be used at present due to the restrictions. Note that the number of subcarriers and the subcarrier bandwidth of each of these bands are constant.

Note that, while restricted, the frequency band is set as a single band (band a), therefore the used frequency band cannot be extended. According to the present Embodiment 11, after the lifting of the restriction described above, the number of used frequency bands becomes four (bands a to d), and the operation can be immediately shift to the operation of the embodiments explained before.

By setting the frequency band as described above, the used frequency band is limited at present, but when the restriction is lifted after that, the operation can be immediately shifted to the system operation according to the present invention. This enables the flexible operation of the communications system.

As explained in detail above, according to the present invention, it becomes possible to easily make the used frequency bandwidth variable, and due to this, the utilization efficiency of the frequency can be much enhanced.

What is claimed is:

1. A communications system for exchange of information between a base station and a terminal by a multicarrier transmission mode using a plurality of frequency bands, the communication system comprising:
   a transmission data generator configured to generate frequency band set information indicating which frequency band is to be used for transmission of dedicated user data information between said base station and terminal, wherein a specific frequency band and the frequency band set including at least one frequency band without the specific frequency band are set from among a plurality of frequency bands assigned to the communications system and are made variable so that the two will not overlap;
   a transmitter configured to transmit the frequency band set information by using the specific frequency band to transmit dedicated user data information by using at least one frequency band and the specific frequency band at a time; and
   a receiver configured to receive the frequency band set information by using the specific frequency band.

2. The communications system as set forth in claim 1, wherein
   one said specific frequency band and at least one said at least one frequency band, other than the specific frequency band, are simultaneously changed.

3. A base station for exchange of information with a terminal in a communications system, the base station comprising:
   a transmission data generator configured to generate frequency band set information indicating which frequency band is to be used for transmission of dedicated user data information between said base station and terminal, wherein a specific frequency band and the frequency band set including at least one frequency band without the specific frequency band are set from among a plurality of frequency bands assigned to the communications system and are made variable so that the two will not overlap; and
   a transmitter configured to transmit the frequency band set information by using the specific frequency band to transmit dedicated user data information by using at least one frequency band and the specific frequency band at a time.

4. A terminal for exchange of information with a base station in a communications system, the terminal comprising:
   a receiver configured to receive a frequency band set information indicating which frequency band is to be used for transmission of dedicated user data information between the terminal and the base station by using a specific frequency band,
   wherein, the frequency band set information is generated by and transmitted from the base station, the specific frequency band and the frequency band set including at least one frequency band without the specific frequency band are set from among a plurality of frequency bands assigned to the communications system and are made variable so that the two will not overlap.

5. A communications system for exchange of information between a base station and a terminal by a multicarrier transmission mode using a plurality of frequency bands, the communication system comprising:
- a base station comprising
- a transmission data generator configured to generate frequency band set information indicating which frequency band is to be used for transmission of dedicated user data information between said base station and terminal, wherein a specific frequency band and the frequency band set including at least one frequency band without the specific frequency band are set from among a plurality of frequency bands assigned to the communications system and are made variable so that the two will not overlap; and
- a transmitter configured to transmit the frequency band set information by using the specific frequency band to transmit dedicated user data information by using at least one frequency band and the specific frequency band at a time; and
- a terminal comprising a receiver configured to receive the frequency band set information by using the specific frequency band.

* * * * *